United States Patent
Priebe et al.

(10) Patent No.: US 9,663,309 B2
(45) Date of Patent: May 30, 2017

(54) AUTOMATED PALLETIZATION METHOD, SYSTEM AND SOFTWARE

(71) Applicant: LIQUOR CONTROL BOARD OF ONTARIO, Toronto (CA)

(72) Inventors: Brian Priebe, Ottawa (CA); Robert Millar, Burlington (CA)

(73) Assignee: LIQUOR CONTROL BOARD OF ONTARIO (LCBO), Toronto (CA)

( * ) Notice: Subject to any disclaimer, the term of this patent is extended or adjusted under 35 U.S.C. 154(b) by 0 days.

(21) Appl. No.: 14/020,431

(22) Filed: Sep. 6, 2013

(65) Prior Publication Data
US 2015/0073588 A1    Mar. 12, 2015

(51) Int. Cl.
G06F 7/00        (2006.01)
B65G 57/00       (2006.01)
B65G 57/26       (2006.01)

(52) U.S. Cl.
CPC ............ *B65G 57/00* (2013.01); *B65G 57/26* (2013.01)

(58) Field of Classification Search
None
See application file for complete search history.

(56) References Cited

U.S. PATENT DOCUMENTS

| | | | | |
|---|---|---|---|---|
| 5,501,571 A * | 3/1996 | Van Durrett | ........... | B65G 61/00 414/21 |
| 7,695,235 B1 | 4/2010 | Rallis | | |
| 2004/0165980 A1 * | 8/2004 | Huang | .................. | B65G 47/90 414/799 |
| 2007/0280814 A1 | 12/2007 | Morency et al. | | |
| 2008/0025832 A1 * | 1/2008 | Pierson | ................ | B65G 47/086 414/790.3 |
| 2008/0131255 A1 | 6/2008 | Hessler et al. | | |
| 2010/0268675 A1 * | 10/2010 | Baldes | ................. | G06Q 10/043 706/13 |
| 2013/0282165 A1 * | 10/2013 | Pankratov | ............ | G06Q 10/043 700/217 |
| 2014/0374216 A1 * | 12/2014 | Pierson | .............. | B65G 47/2445 198/416 |

FOREIGN PATENT DOCUMENTS

NO   WO 2010099809 A1 *  9/2010  ........... B65G 57/005
WO   WO 2010099809 A1 *  9/2010

OTHER PUBLICATIONS

Scheithauer, Guntram and Sommerweiβ, Uta, "4-block heuristic for the rectangle packing problem", Aug. 1996, pp. 1-22.
Scheithauer, Guntram and Terno, Johannes, "The G4-Heuristic for the Pallet Loading Problem", 1996, pp. 1-17.

* cited by examiner

*Primary Examiner* — Yolanda Cumbess

(57) ABSTRACT

An automated palletizer system comprises a plurality of container buffers and a sensor for measuring containers in the buffers. A controller computes a selected tier layout for building by a pallet loading machine in a tier of a pallet within a defined periphery. The controller computes candidate tier layouts, each comprising a two-dimensional arrangement of containers in the buffers. The controller calculates a value of a tier quality metric for each candidate layout, representing at least one of stability, area utilization and volume utilization. One of the candidate layouts is selected based on the tier quality metric and the pallet loading machine arranges containers according to the selected tier layout.

29 Claims, 21 Drawing Sheets

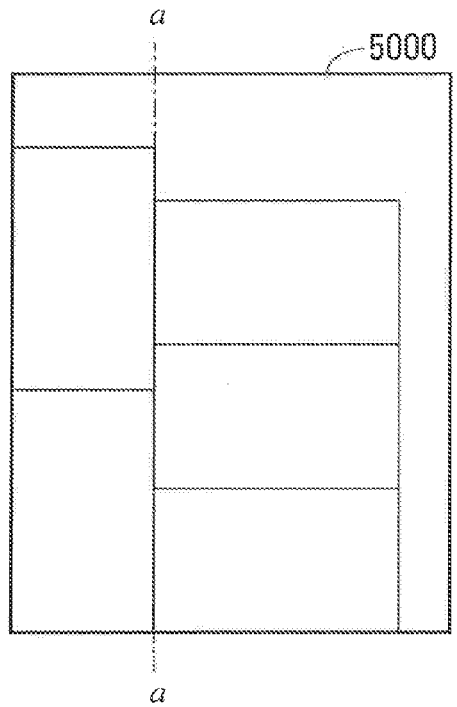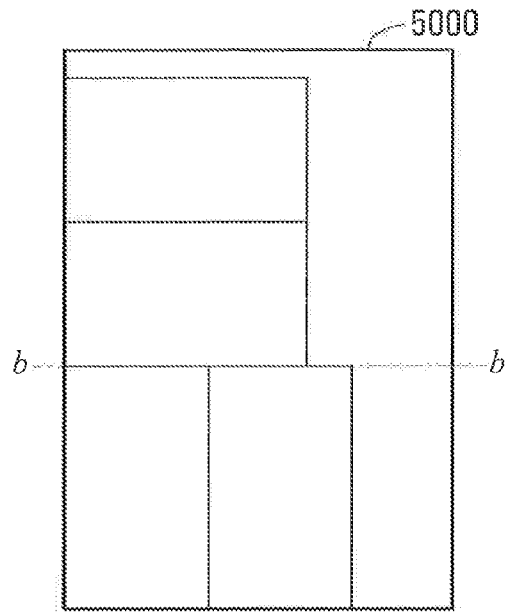
FIG. 12A  FIG. 12B
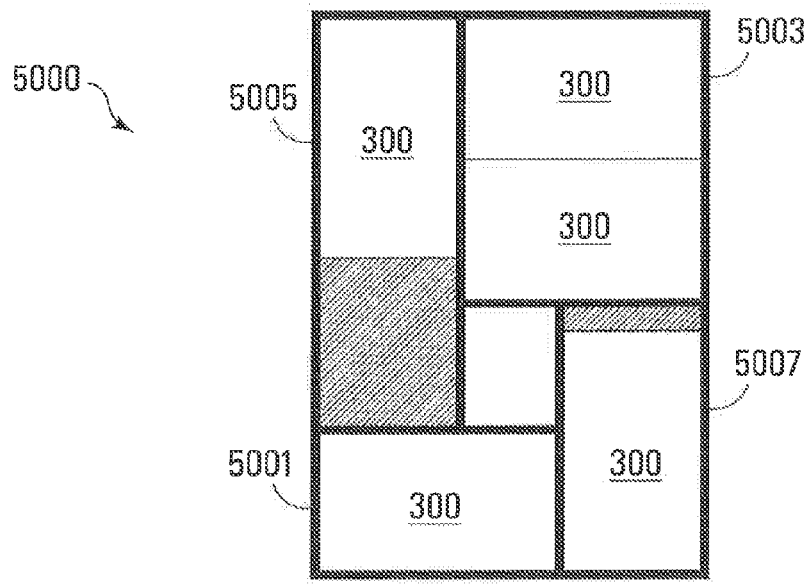
FIG. 13

AUTOMATED PALLETIZATION METHOD, SYSTEM AND SOFTWARE

FIELD

The present invention relates to methods, devices and software for palletizing items, and particularly to palletizing items of different sizes for shipment.

BACKGROUND

Modern distribution facilities typically receive a large variety of products from many sources. Such products are warehoused for later outbound shipment, for example to customers or to retail facilities. Different products may arrive and be stored in containers (e.g. boxes) of varying types and sizes. Outbound shipments often include multiple product types, in containers of multiple sizes. For efficiency, such products are typically packed together in generally standard shipping units, for example, as pallets.

Traditionally, pallets with items of non-uniform size have been packed by human operators. Operators rely on experience to stack containers and other items in such a way that the finished pallets are stable and that the items will not be easily toppled, crushed or otherwise damaged. Unfortunately, palletizing items in this manner is costly and slow, and can result in injury. Moreover, manual palletizing is prone to human error, often resulting in product damage.

Accordingly, new methods and devices are desired for palletizing items of different sizes.

SUMMARY

In aspects of the present disclosure, an automated palletizer system comprises a plurality of container buffers, a sensor for measuring containers in the buffers, a pallet loading machine, and a controller in communication with the sensor and pallet loading machine. The controller is operable to compute a selected tier layout for budding by a pallet loading machine in a tier of a pallet within a defined periphery. The controller is operable to compute candidate tier layouts, each comprising a two-dimensional arrangement of containers in the buffers; calculate a value of a tier quality metric for each candidate layout, representing at least one of stability, area utilization and volume utilization; select one of the candidate layouts is selected based on the tier quality metric; and instruct the pallet loading machine to arrange containers according to the selected tier layout.

According to an aspect, there is provided a method of placing generally rectangular items of varying sizes on a pallet, the method comprising: measuring the dimensions of a plurality of the items; and forming a plurality of tiers of the items atop a base; wherein the forming comprises, for each tier: defining a periphery based on the dimensions of an underlying supporting surface; generating a plurality of candidate tier layouts, each of the candidate tier layouts comprising two dimensional arrangement of a subset of the plurality of items in a tier of the pallet, wherein the two dimensional arrangement is bounded by the periphery; calculating a value of a tier quality metric for the candidate tier layouts, the tier quality metric representing at least one of stability, area utilization and volume utilization; selecting one of the candidate tier pattern layouts based on the tier quality metric; and positioning items of the subset of items in the selected one of the candidate tier layouts atop the pallet according to the selected candidate tier layout using a pallet loading machine.

According to another aspect, there is provided an automated palletizer system comprising a plurality of container buffers; at least one sensor for measuring the dimension of containers in the container buffers; a pallet loading machine for arranging containers from a subset of the container buffers in a tier of a pallet within a defined periphery; and a controller in communication with the at least one sensor and the pallet loading machine, the controller operable to compute a selected tier layout for use by the pallet machine, the controller operable to; compute a plurality of candidate tier layouts, each of the candidate tier layouts comprising two dimensional arrangement in the tier of the pallet formed from a subset of containers in the container buffers; calculate a value of a tier quality metric for each of the candidate tier layouts, the tier quality metric representing at least one of stability, area utilization and volume utilization; select one of the candidate tier layouts as the selected tier layout based on the tier quality metric; and instruct the pallet loading machine to arrange items in the subset of containers in the selected tier layout, according to the selected tier layout.

Other aspects and features will become apparent to those of ordinary skill in the art upon review of the following description of specific embodiments of the invention in conjunction with the accompanying figures.

BRIEF DESCRIPTION OF THE DRAWINGS

In the figures, which illustrate example embodiments:

FIGS. 12A and 12B are schematic diagrams of compound container patterns;

FIG. 13 is a schematic diagram of a pinwheel container pattern;

DETAILED DESCRIPTION

Figure 1:
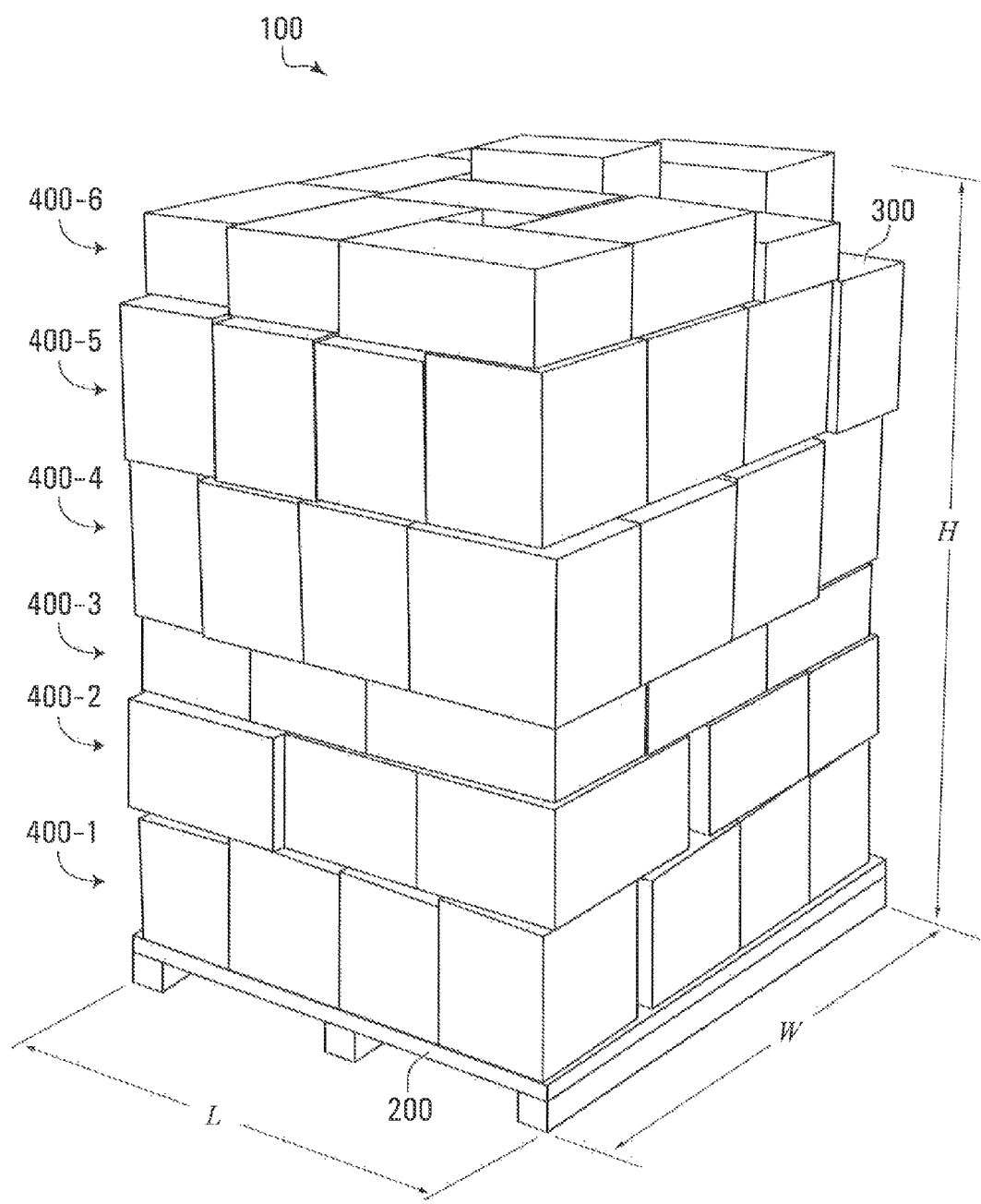
FIG. 1 is a perspective view of a pallet of containers stacked in manners exemplary of embodiments of the present invention.

FIG. 1 depicts a pallet 100 of items palletized for shipping, in manners exemplary of embodiments of the present invention. Pallet 100 includes a skid 200 and a plurality of rectangular containers 300 (e.g. boxes) which are stacked on skid 200 in a number of tiers 400-1, 400-2, 400-3, 400-4, 400-5 and 400-6 (individually and collectively, tiers 400). Six tiers 400 are depicted, however the number of tiers may vary from pallet to pallet.

Skid 200, on which pallet 100 is constructed, acts as a base, and is a standard skid, suitable for allowing pallet 100 to be moved by a forklift or other similar material handling device. Skid 200 may be a standard size, e.g. 40 inches in length (l) by 48 inches in width (w). Other sizes or types of skids, or other types of bases may alternatively be used, as will be apparent to skilled persons.

Pallet 100 may make up part or all of a shipment of products from a distribution centre to a destination, such as a retail store. Pallet 100 contains a number of different products, which are shipped in containers of differing sizes (length, width and/or height). Containers 300 are stacked on skid 200 in tiers 400, up to a maximum height, h, which may be pre-defined based on constraints of material handling equipment, storage rack sizes, or the like.

Each tier 400 of containers 300 is supported by skid 200 or an underlying tier of containers, acting as a base for higher tiers of pallet 100. That is, containers 300 in tier 400-1 are supported by skid 200; containers 300 in tier 400-2 are supported by containers 300 in tier 400-1; containers 300 in tier 400-3 are supported by containers 300 in tier 400-2, and so on. Of note, no containers are stacked upon the containers 300 of top tier 400-6.

To facilitate handling and transport of pallet 100, containers 300 are therefore stacked in a manner that is intended to provide stability. As such, tiers 400-1 through 400-5 are formed of containers 300 having similar height to provide a relatively flat surface for supporting the subsequent tier, and the overall length and width of each tier is similar, though the length and width of each successive tier 400 may decline slightly. In contrast, containers 300 of tier 400-6 vary widely in height. As tier 400-6 does not support another tier, it need not have a smooth upper surface.

Stability may further be served by densely packing containers 300 so that there are no gaps or only small gaps between containers 300 in a tier 400. As will be appreciated, densely packing containers may also provide for efficiency in handling, by limiting wasted space in a pallet 100.

Figure 2:
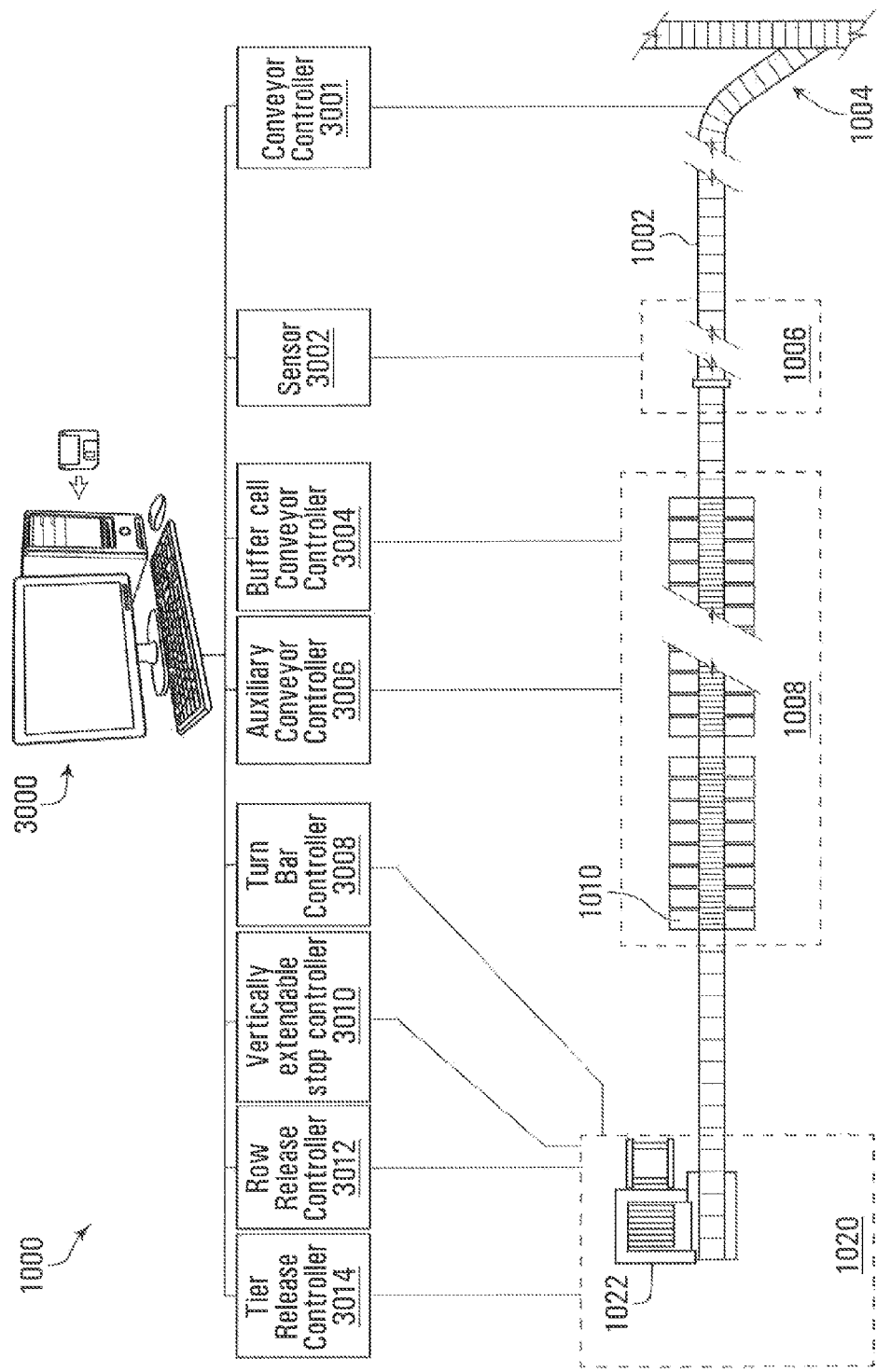
FIG. 2 is a schematic view of a shipping lane in a distribution facility and associated control equipment exemplary of embodiments of the present invention.

FIG. 2 depicts a lane 1000 for palletizing containers or other regularly shaped items. Lane 1000 includes a motorized conveyor 1002 for advancing containers through the lane. Containers are fed onto the conveyor 1002 from an infeed conveyor 1004. Components of lane 1000 are connected to and controlled by a control server 3000 by way of a number of controllers and input/output (I/O) units. Control server 3000 is under software control.

Motorized conveyor 1002 passes through a gate 1006, which is equipped with a sensor 3002 for measuring the length, width and height of each container as it passes through gate 1006. In one embodiment, sensor 3002 may be a VMS 410 volume measurement device, manufactured by SICK AG. In other embodiments, sensor 3002 may be one or more cameras, optical sensors, or other suitable machine vision device. Sensor 3002 is connected to control server 3000 and provides the measured dimensions of each container conveyed through gate 1006. Sensor 3002 may be connected to control server 3000 by parallel connection, Ethernet, usb, wi-fi, or any other suitable wired or wireless connection, which will be apparent to those skilled in the art.

Figure 3:
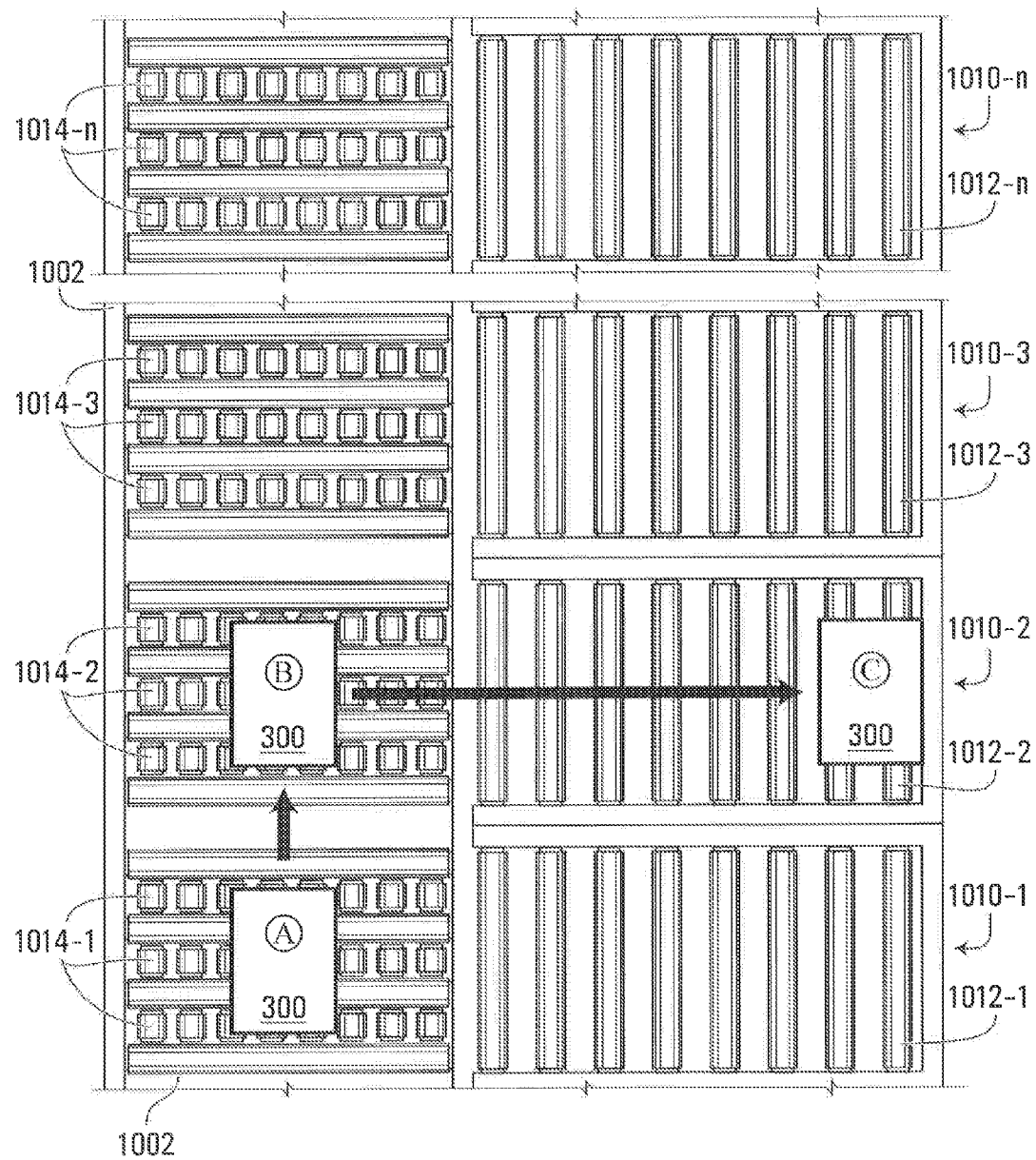
FIG. 3 is a partial schematic diagram of a buffering area of the shipping lane of FIG. 2.

After passing through gate 1006, conveyor 1002 passes through a buffering area 1008. FIG. 3 depicts buffering area 1008 in greater detail. Buffering area includes a plurality of buffer cells 1010-1, 1010-2, 1010-3, . . . 1010-n (individually and collectively, buffer cell(s) 1010), which collectively act as a buffer for containers 300 waiting to be palletized. Each buffer cell 1010 has a buffer cell conveyor 1012 and auxiliary conveyors 1014. As depicted, conveyor 1002 comprises a plurality of motorized rollers, spaced apart at an interval selected to ensure constant contact of at least one roller with containers being conveyed. Conveyor 1002 may operate in one or more discrete sections, with each section being individually controllable so that the rollers of any given section can be activated at any time. Auxiliary conveyors 1014 comprise a plurality of motorized rollers oriented to move objects transversely to conveyor 1002. Auxiliary conveyors 1014 are positioned in the spaces between rollers of conveyor 1002 and are retractable below the surface defined by conveyor 1002. Buffer cell conveyors 1012 likewise comprise a plurality of motorized rollers. While conveyor 1002 moves containers in a longitudinal direction, each of buffer cell conveyors 1012 and auxiliary conveyors 1014 move containers in a transverse direction, either into or out of a buffer cell. Auxiliary conveyors 1014-1 and buffer cell conveyor 1012-1 can move containers in or out of buffer cell 1010-1.

More specifically, auxiliary conveyors 1014 and buffer cell conveyors 1012 are normally idle, with auxiliary conveyors 1014 retracted below conveyor 1002 so as not to interfere with the conveying of containers on conveyor. When it is desired to store a container in a specific buffer cell 1010, the auxiliary conveyor 1014 and buffer cell conveyor 1012 associated with that buffer cell 1010 are activated. More specifically, auxiliary conveyor 1014 is extended so that it contacts a container 300, and directs that container 300 into the buffer cell 1010, passing container 300 to buffer cell conveyor 1012. When it is desired to release a container from a buffer cell, the appropriate buffer cell conveyor 1012 and auxiliary conveyor 1014 are again activated, with the conveyors working in the opposite direction to pass the container onto conveyor 1002.

In FIG. 3, buffer cells 1010 are depicted on one side of conveyor 1002. However, buffer cells 1010 may be located on both sides of conveyor 1002. Auxiliary conveyors 1014 may be bi-directional so as to load containers 300 into buffer cells 1010 on either the left or the right of conveyor 1002.

Buffering area 1008 also includes at least one buffer cell conveyor controller 3004 for controlling operation of buffer cell conveyors 1012. Buffer cell conveyor controller 3004 may be, for example a PLC or a similar controller. Buffer cell conveyor controller 3004 has sufficient outputs so that it can individually actuate the buffer cell conveyor 1012 for each buffer cell 1010. Controller 3004 can cause the buffer cell conveyors 1014 to run either forward or backward, to convey a container into or out of a buffer cell.

Buffering area 1008 further includes at least one auxiliary conveyor controller 3006 for controlling operation of the auxiliary conveyors 1014. Auxiliary conveyor controller 3006 may be a PLC or similar controller like buffer cell conveyor controller 3004. Auxiliary conveyor controller 3006 has sufficient outputs to individually control the auxiliary conveyors for each buffer cell. In some embodiments, the auxiliary conveyors 1014 and buffer cell conveyors 1012 for each buffer cell may be commonly controlled. That is, a single signal from a single controller 3004 may be used to actuate both the buffer cell conveyor 1012 and auxiliary conveyor 1014 for each buffer cell 1010.

Buffer cell conveyor controller 3004 and auxiliary conveyor controller 3006 may both be connected to control server 3000 using appropriate wired or wireless connections, which will be apparent to those of skill in the art. For example, they may be connected by parallel port connection, usb, Ethernet, wi-fi or the like. In other embodiments, one or more of conveyor controller 3004; auxiliary conveyor controller 3006; and control server 3000 may be combined into a single controller—which may also be programmable, and which may, for example take the form of a PLC.

As further described below, after a container 300 passes through gate 1006, it may be assigned to and temporarily stored in a buffer cell 1010 and subsequently released when it is to be palletized.

After being released from a buffer cell 1010, a container 300 is passed back onto conveyor 1002, which carries container 300 to a pallet loader 1022. Pallet loader 1022 includes a turn bar controller 3008, vertically extendible stop controller 3010, row release controller 3012 and tier release controller 3014.

Figure 4:
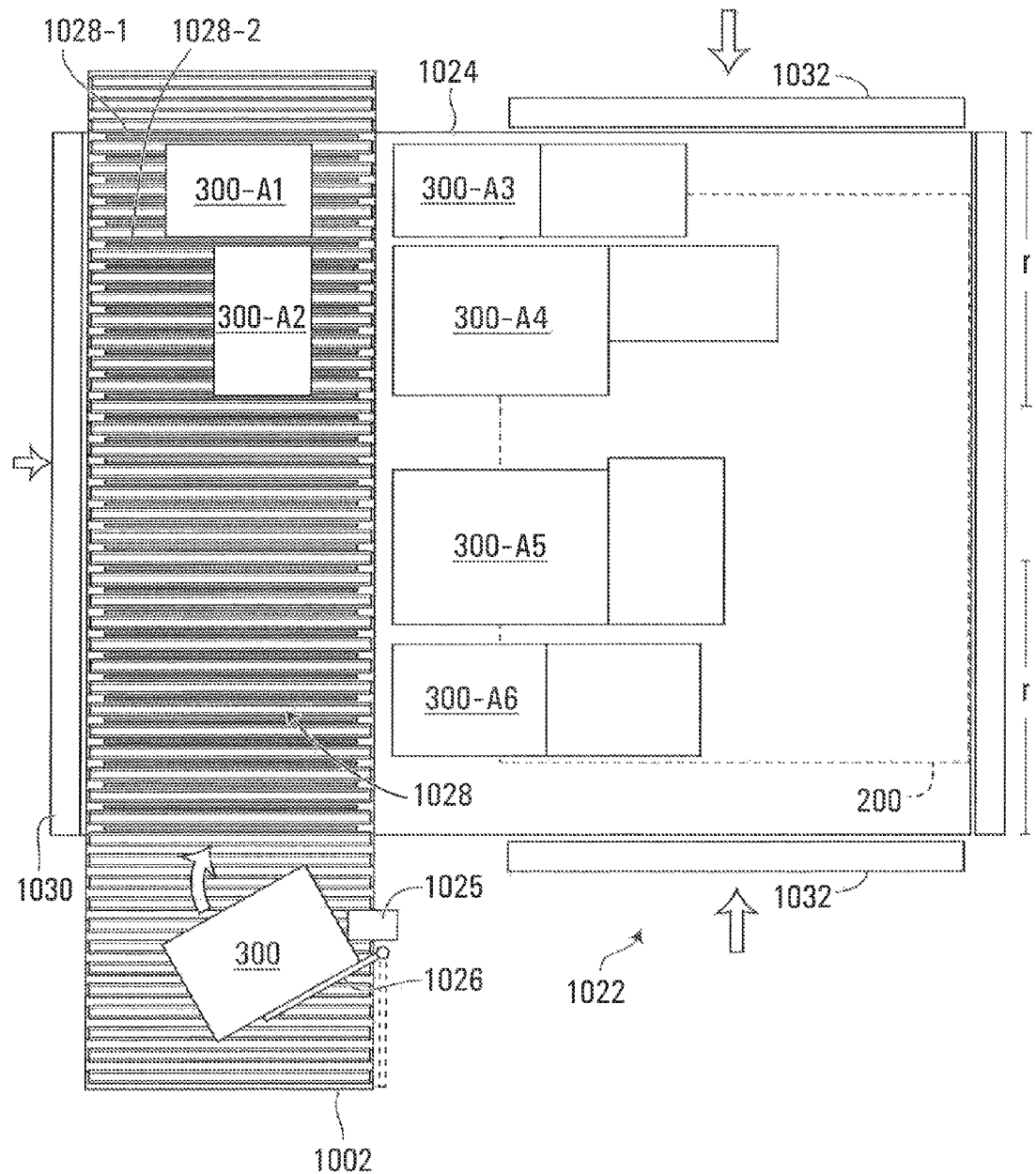
FIG. 4 is a schematic diagram of a pallet loader of the shipping lane of FIG. 2.

An example pallet loader 1022 is depicted in FIG. 4. Pallet loader 1022 receives containers, positions and orients them as desired, and assembles them into palletized tiers 400.

Pallet loader 1022 includes a retractable apron 1024 positioned beside conveyor 1002, with its top surface flush or slightly below the top surface of conveyor 1002. Tiers of containers are constructed atop apron 1024. Apron 1024 is a flat sheet which may be metal, wood, plastic or the like.

Conveyor 1002 carries containers 300 to pallet loader 1022 and terminates just inside the limits of pallet loader 1022. At the entry to pallet loader 1022, a shoe 1025 and turn bar 1026 are mounted beside conveyor 1002. Shoe 1025 is laterally extendable from a stowed position in which it is withdrawn from conveyor 1002 to an extended position in which it overhangs conveyor 1002 as depicted. Turn bar 1026 is rotatable from a stowed position, shown in FIG. 4 in broken line, to an extended position, shown in solid line. Both shoe 1025 and turn bar 1026 are operated by electro-mechanical actuators (not shown). When in the extended position, shoe 1025 contacts a front corner of a container 300 being conveyed into the pallet loader, and continued motion of conveyor 1002 causes the container 300 to pivot around the shoe 1025. turn bar 1026. Turn bar 1026 is meanwhile rotated to its extended position, further assisting container 300 to rotate. Shoe 1025 and turn bar 1026 can thus be used to change the orientation of containers. That is, if desired, shoe 1025 and turn bar 1026 can be used to turn containers by 90 degrees. Shoe 1025 and turn bar 1026 are in communication with turn bar controller 3008, which sends signals to their respective actuators to cause shoe 1025 and turn bar 1026 to move to between their stowed and extended states, as desired. In alternate embodiments, other types of container turning apparatus may be used, which will be apparent to skilled persons.

Pallet loader 1022 further includes a number of vertically extendible bars 1028 for positioning containers. Vertically extendible bars 1028 are positioned in the spaces between rollers of conveyor 1002. Vertically extendible bars 1028 are retractable. Normally, vertically extendible bars 1028 are stored in a retracted position, below the surface defined by conveyor 1002. However, in response to a signal from the vertically extendible stop controller 3010, any of vertically extendible bars 1028 can move into an extended position above conveyor 1002. In the extended position, vertically extendible bars 1028 serve as stops for containers 300 along the length of pallet loader 1022. For example, as depicted, vertically extendible bar 1028-1 extends up to stop container 300-A1 in the indicated position. Vertically extendible bar 1028-2 extends up to stop container 300-A2 in the indicated position. Vertically extendible bars 1028 also serve to align containers 300 in the desired orientation. Prior to contacting a vertically extendible bar 1028, a container 300 passed into pallet loader 1022 may be skewed at some small angle to vertically extendible bars 1028 when conveyor 1002 pushes a container against an extended bar 1028, it causes the container 300 to be squared up to the alignment of the bar 1028.

A small gap exists between vertically extendible bars 1028, and thus, between the possible stop positions of containers 300. The gap at least corresponds in size to the width of the rollers of conveyor 1002. Maintaining a gap between adjacent containers 300 tends to prevent containers 300 from binding against one another as they are slid onto the apron 1024. However, as will become apparent, these gaps between containers 300 may be reduced in size or eliminated entirely before a tier 400 is completed.

Containers 300 are sequentially conveyed into pallet loader 1022 in an order determined by control server 3000. Control server 3000, by way of vertically extendible stop controller 3010, causes respective bars 1028 to stop each container in a predetermined position and stages containers 300 row-by-row for palletizing.

A row transfer bar 1030 is positioned adjacent conveyor 1002 opposite apron 1024. Row transfer bar 1030 is controlled by control server 3000 through a row release controller 3012. When signalled by row release controller 3012, the row transfer bar extends over conveyor 1002 and pushes containers from the conveyor onto apron 1024.

Apron 1024 is larger than pallet 100, which is positioned below the apron. To allow for ease of manipulation of containers by row transfer bar 1030 (for example, to prevent containers from binding on one another), when transferred onto apron 1024, containers 300 may be spread apart from one another, and may extend beyond the limits of pallet 100. For example, as depicted in FIG. 4, containers 300-A3, 300-A4, 300-A5 and 300-A6 make up a row. Container 300-A3 extends beyond the edge of pallet 100. Pallet loader 1022 is therefore equipped with two squeezer bars 1032, positioned adjacent apron 1024 and slightly above its surface. Squeezer bars 1032 are parallel to the edges of pallet 100. In response to a signal from tier release controller 3014, squeezer bars extend inwardly to position the containers within the limits of pallet 100. Squeezer bars 1032 are centered over pallet 100 and are designed so that they both move inwardly by an equal distance. Thus, after being squeezed by squeezer bars 1032, containers on apron 1024 will be centered over skid 200. Squeezer bars 1032 have a range of travel r and may be extended to any point within their range of travel, provided the bars extend an equal distance. Centering of squeezer bars 1032 in their extended positions may be effected mechanically, by an appropriate linkage, or electronically, under the control of tier release controller 3014.

Skid 200 is supported on a height-adjustable carriage (not shown). Skid 200 and thus, pallet 100, is positioned below the apron while a tier 400 is constructed. Once a tier is completed, a strap may be wrapped around the tier's perimeter to bind the containers 300 of the tier together. Strapping may, for example, be applied by an electronically-controlled, height-adjustable strapper (not shown) such as an Endra™ strapping machine, sold by Strapex™, programmed to apply the strap at a height less than that of the shortest container in the tier.

In another embodiment, the strap may be manually applied by human operators.

After strapping, apron 1024 is withdrawn, and the constructed tier is allowed to fall a short distance (e.g. less than 20 cm) onto pallet 100. Pallet 100 is then lowered on the height-adjustable carriage so that the newly-constructed tier is just below the apron. The apron is then extended back into position for construction of a new tier.

Figure 5:
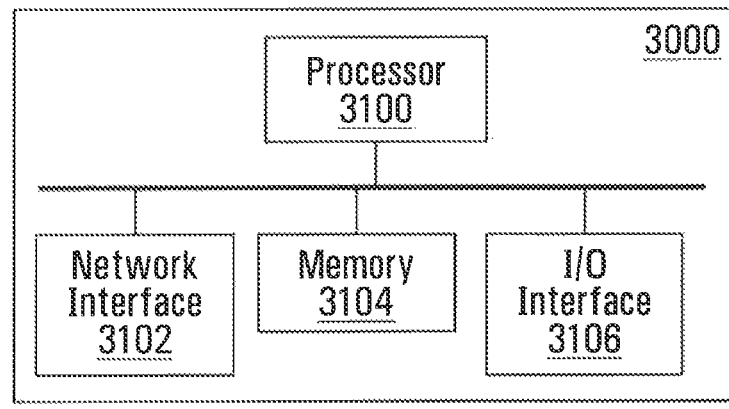
FIG. 5 is a schematic block diagram of a control server of the shipping lane of FIG. 2.

Operation of palletizing lane 1000 is controlled by control server 3000, itself under software control. FIG. 5 is a block diagram of example hardware components of control server 3000. Control server 3000 includes processor 3100, network interface 3102, a suitable combination of persistent storage memory 3104, random access memory and read only memory and one or more I/O interfaces 3106. Processor 3100 may be an Intel x86, PowerPC, ARM processor or the like. Network interface 3102 interconnects control server 3000 to a network (not shown). Memory 3104 may be organized using a conventional filesystem. Control server 3000 may include input and output peripherals interconnected to control server 3000 by one or more I/O interfaces 3106. These peripherals may include a keyboard, display, mouse and one or more devices such as DVD drives, USB ports and the like for reading computer-readable storage media. Software components exemplary of embodiments of the present invention may be loaded into memory 3104 over network interface 3102 or from one or more peripheral devices.

As noted above, control server 3000 is in communication with numerous sensors and controllers, such as programmable logic controllers (e.g. Allen-Bradley ControlLogix™ programmable logic controllers), to control operation of and receive information from components of palletizing lane 1000. The controllers and sensors may be connected to control server 3000 via network interface 3102, e.g. by Ethernet or wi-fi connection. Alternatively or additionally, controllers or sensors may be connected via I/O interface 3106, e.g. by USB or Bluetooth connection.

Figure 6:
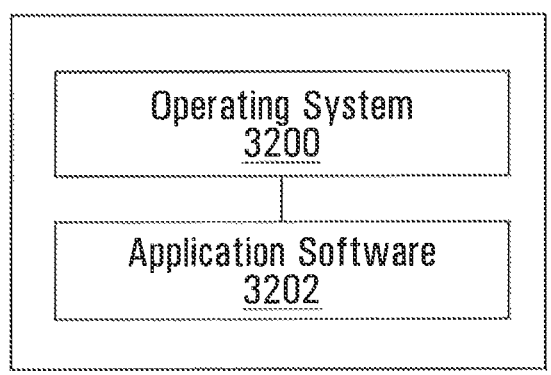
FIG. 6 is a schematic block diagram of software components at the control server of FIG. 5.

FIG. 6 depicts a simplified organization of example software components stored at control server 3000 for execution by the server. As illustrated, software components include an operating system (O/S) 3200 and application software 3202.

O/S 3200 controls overall operation of control server 3000 and controls and administers a filesystem maintained in memory 3104. O/S 3200 may, for example, be a UNIX-based operating system (e.g., Linux, FreeBSD, Solaris, OSX, etc.), a Microsoft Windows operating system, or the like. O/S 3200 allows other software components to access processor 3100, network interface 3102, memory 3104, and one or more I/O interfaces 3106 of control server 3000. O/S software 3200 may include a TCP/IP stack allowing control server 3000 to communicate with other computing devices through network interface 3102 using the TCP/IP protocol.

Figure 7:
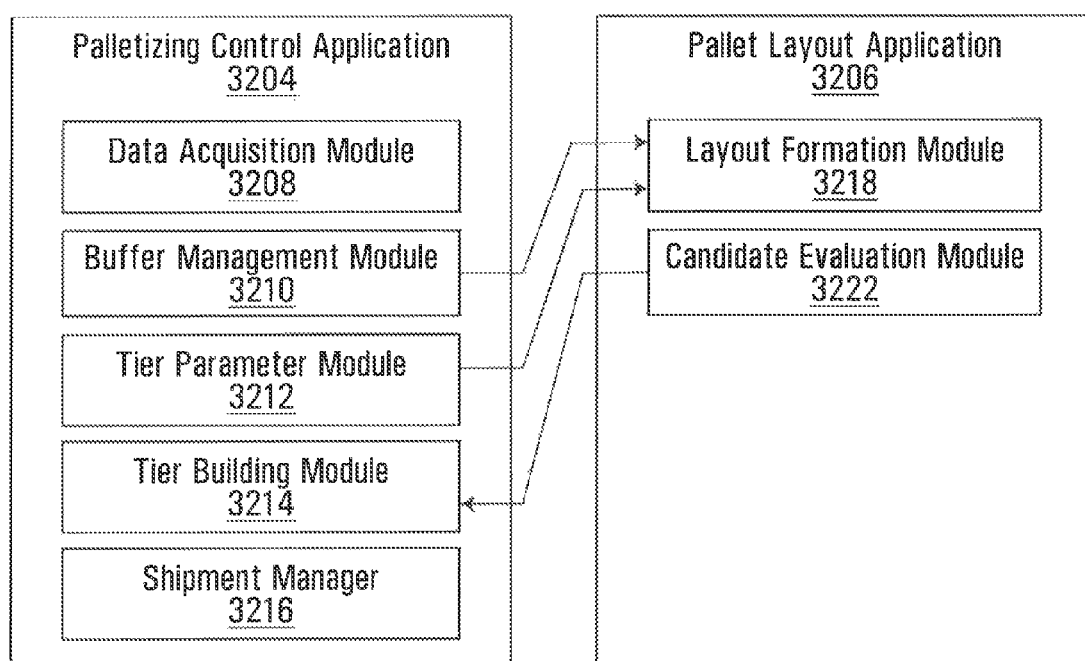
FIG. 7 is a schematic block diagram of components of software at the control server of FIG. 5.

Application software 3202 running at control server 3000 may include a plurality of components as depicted in FIG. 7. The components of the application software comprise major functional software blocks, each including a number of submodules. The functional blocks include a palletizing control block 3204 and a pallet layout block 3206.

Palletizing control block 3204 is responsible for the overall operation of palletizing lane 1000. Palletizing control block 3204 includes a data acquisition module 3208, a buffer management module 3210, a tier parameter module 3212, a tier building module 3214 and a shipment manager 3216.

Data acquisition module 3208 interfaces with gate sensor 3002, conveyor controller 3001, buffer cell conveyor controller 3004 and auxiliary conveyor controller 3006 to receive data. Gate sensor 3002 reports the dimensions of each container that is conveyed past gate 1006. Conveyor controller 3001, buffer cell conveyor controller 3004 and auxiliary conveyor controller 3006 report the status of each respective conveyor at any given point in time. The combination of the data reported by gate sensor 3002 and conveyor controller 3001, buffer cell conveyor controller 3004 and auxiliary conveyor controller 3006 enables palletizing control block 3204 to track the progress of each container through lane 1000 and to assign each container to a specific buffer cell 1010 in the buffering area.

Data acquisition module 3208 passes container data to buffer management module 3210. Buffer management module 3210 stores the container data in a buffer content table. The buffer content table holds, for each buffer cell 1010, a buffer cell status, indicating whether a container is assigned to the buffer cell, a container ID if a container is assigned to the buffer cell, container dimensions, and optionally, additional container data such as a product name. Additional container data such as a product name may for example be obtained from a barcode reader or by correlation of measured container sizes with a pre-existing database of container types. A specific container may be assigned to a buffer cell when it passes gate 1006, before the container physically reaches the buffer cell. However, the calculations referred to hereinafter may be carried out before a given container physically occupies a specific buffer cell. Indeed, a specific container may be needed as part of a tier before it physically reaches the buffer cell to which it is assigned. Accordingly, references herein to containers in buffer cells 1010 include containers which have been assigned, but have not yet physically arrived at, buffer cells 1010. Similarly, references to releasing containers from buffer cells 1010 includes scenarios in which containers are assigned to, but not yet present in, buffer cells 1010. In such cases, containers may simply be diverted directly to pallet loader 1022, provided that containers arrive at the pallet loader in the specified order.

When the buffer content table indicates that a predetermined desired number of buffer cells 1010 are occupied, palletizing control block 3204 causes pallet layout block 3206 to be invoked and passes the contents of the buffer content table to layout formation module 3218 of pallet layout block 3206.

Tier parameter module 3212 tracks the periphery (the maximum allowable length and width) of a tier to be assembled and palletized. For the lower-most tier 400-1 of a pallet 100, the allowable dimensions are the length and width of the skid 200, plus a preset allowable overhang. The amount of overhang allowable may vary depending on the specific application and may be influenced by, for example, material handling equipment to be used with completed pallets. In an example, skid 200 may be 40 inches long and 48 inches wide, and 0.5 inches of overhang may be allowed on all sides. However, these dimensions may differ in other applications. In some applications, no overhang is allowed.

Tiers 400 other than the bottom tier of a pallet are supported by the containers of the underlying tier, rather than by skid 200. Accordingly, the maximum allowable length and width for a non-bottom tier are based on the dimensions of the underlying tier, plus overhang.

Dimensions of skid 200 and the allowable overhang may be provided as parameters to tier parameter module 3212. In addition, tier parameter module 3212 may accept as inputs the parameters of each tier built and palletized by tier building module 3214. Such parameters may be used to determine the allowable size of a next tier. Tier parameter module 3212 may report the maximum length and width of the in-progress tier to layout formation module 3218 of pallet layout block 3206.

Tier building module 3214 receives as its input, a definition of a selected tier layout from layout selection module 3222. Using container IDs from buffer management module 3210, layout selection module 3222 reports the containers 300 to be included in a tier 400, as well as their respective positions and orientations.

From the defined tier layout, tier building module 3214 determines the sequence in which containers need to be released from buffer cells 1010, whether each container needs to be turned, and where each container is to be stopped by the vertically extendible bars 1028. Tier building module 3214 uses this information to formulate and send instructions to the various controllers of lane 1000.

Shipment manager 3216 enables the creation of documentation and/or tracking of containers palletized to fulfil a particular order. Shipment manager 3216 receives a report of each completed, palletized tier, including an indication of whether a given tier is a topmost tier of a pallet. When a pallet is completed, that is when a top tier is palletized, shipment manager 3216 may notify an operator and create documents such as shipping labels.

In some embodiments, shipment manager 3216 may track the progress of an order being palletized and may end the palletizing operation and notify an operator when an order is completed. In other embodiments, palletizing may simply end when no containers remain to be palletized.

Layout formation module 3218 receives as inputs the maximum dimensions for a tier layout (from tier parameter module 3214) and the contents of buffer cells 1010 (from buffer management module 3210). Layout formation module 3218 is programmed with a set of constraints as to allowable configurations of candidate tier layouts. Using the dimensions of the containers in buffer cells 1010, layout formation module 3218 iteratively attempts to calculate possible arrangements of containers which fit within the defined tier layout size, and which satisfy the programmed constraints.

Figure 9A:
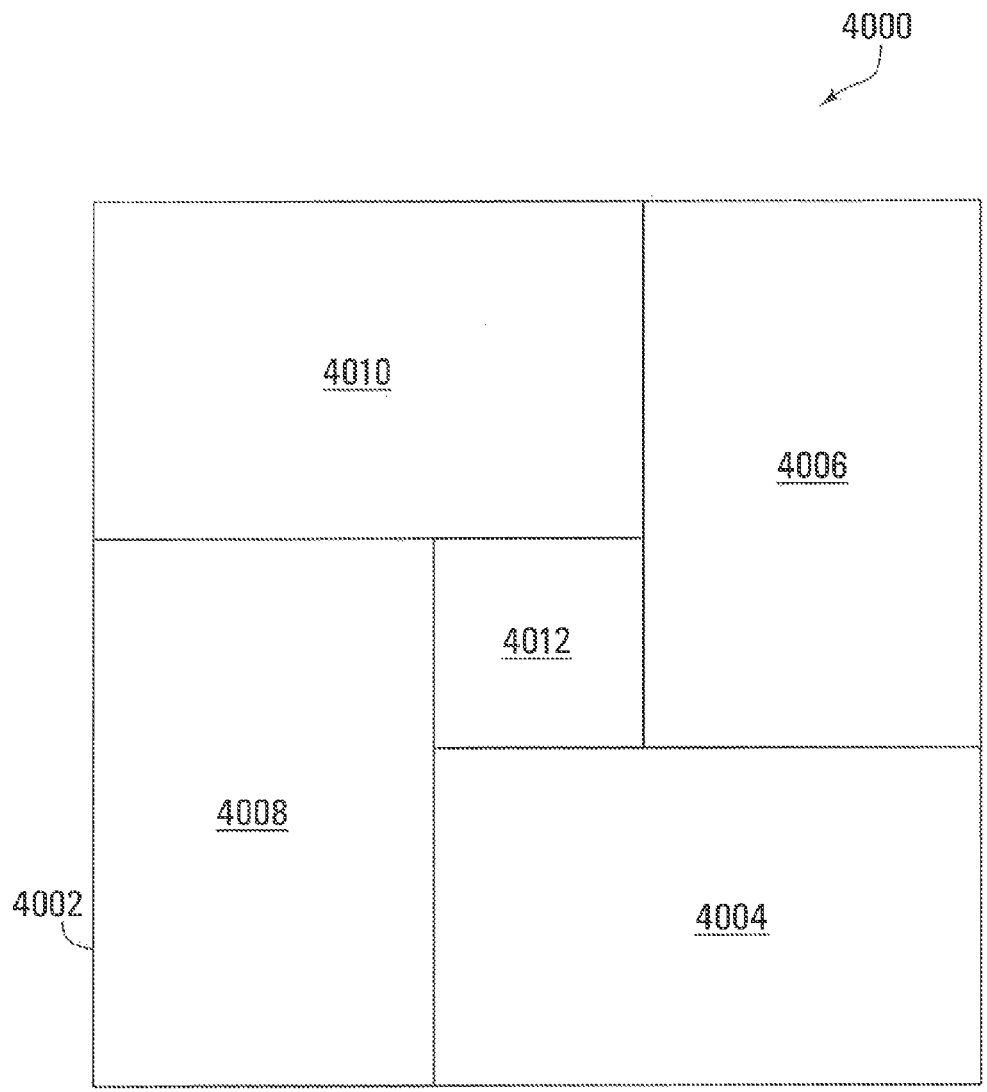
FIG. 9A is a block diagram of a 5-block arrangement used by the control server of FIG. 5 to calculate candidate tier layouts.

As depicted in FIG. 9A, layout formation module 3218 calculates possible tier layouts 4000 by defining a periphery 4002 for a candidate tier layout, with length and width corresponding to the maximum allowable dimensions received from tier parameter module 3214. Layout formation module 3218 then iteratively attempts to fill the area bounded by periphery 4002 by defining patterns of containers 300 which form building blocks, and then arranging selected ones of those patterns to occupy rectangular blocks within periphery 4002. As used herein, the term candidate layout refers to an arrangement of one or more rectangular blocks occupying periphery 4002.

Figure 8A:
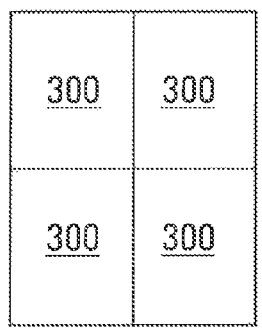
FIGS. 8A, 8B, 8C, 8D and 8E are block diagrams of container patterns used by the control server of FIG. 5 to generate candidate tier layouts.
Figure 8B:
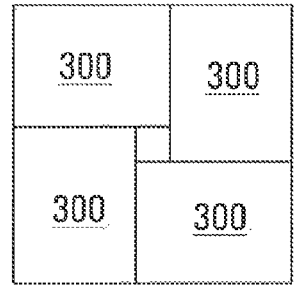
Figure 8C:
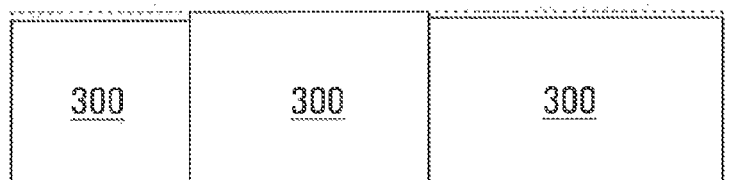
Figure 8D:
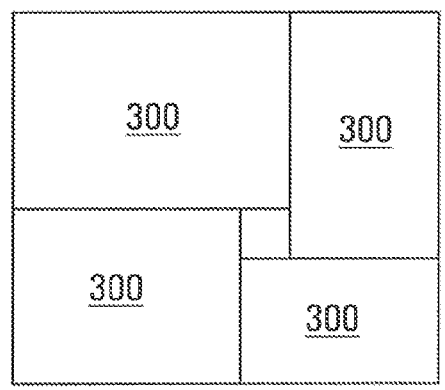
Figure 8E:
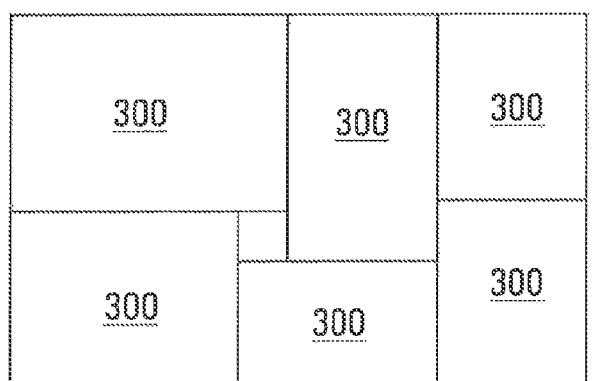

In brief overview, layout formation module 3218 iteratively calculates feasible patterns by using the containers 300 in buffer cells 1010 to occupy rectangular boundaries. Patterns may be grid patterns of same-size containers, as shown in FIG. 8A, pinwheel patterns of same-size containers, with one container at each corner of a bounding rectangle, as shown in FIG. 8B, linear strips of containers which are dissimilar in size, but which share a common dimension, as shown in FIG. 8C, or pinwheel patterns of containers dissimilar in size, as shown in FIG. 8D. In some instances, container edges may align to define a guillotine cut, effectively partitioning a pattern into two sub-patterns, as depicted in FIG. 8E.

Figure 9B:
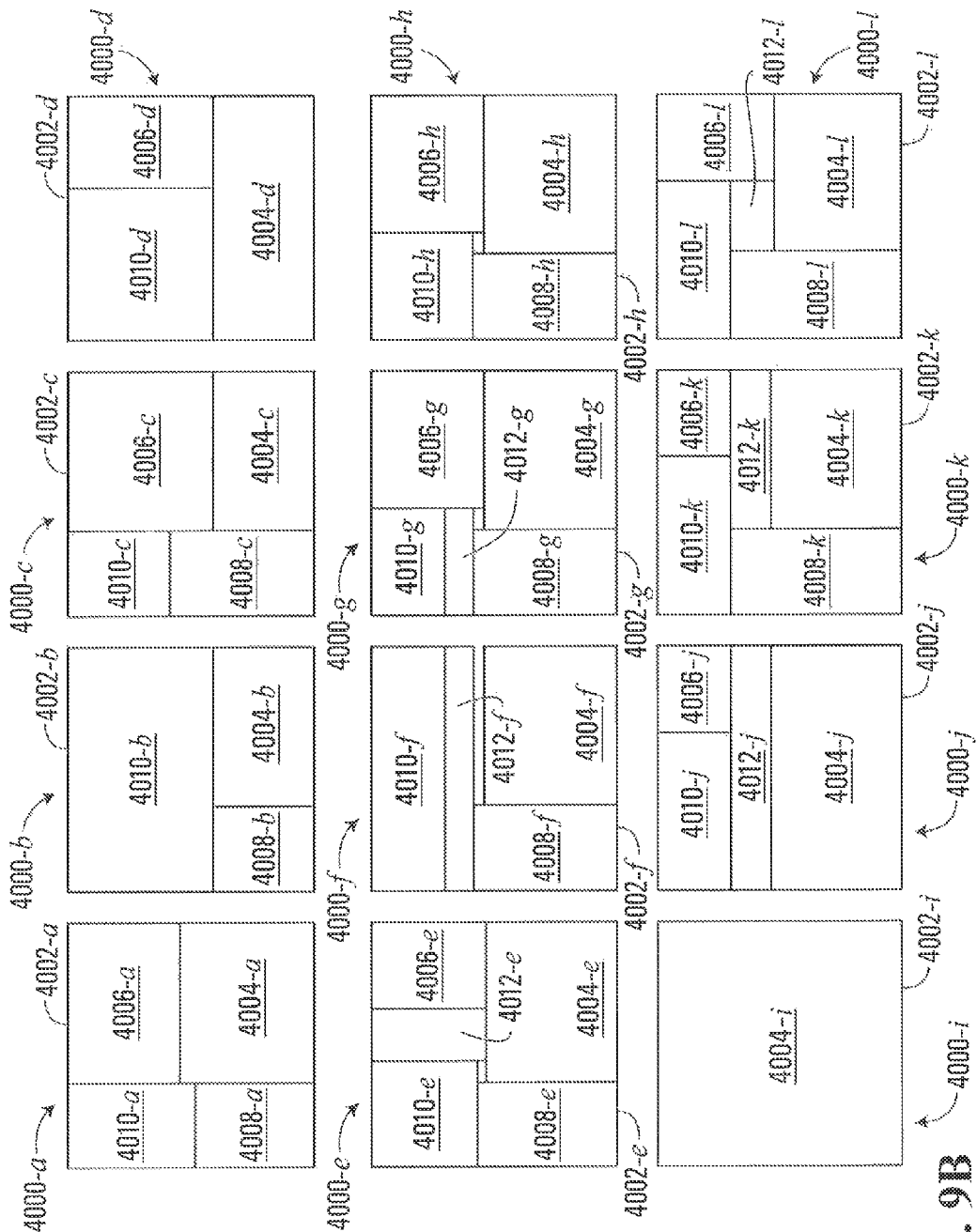
FIG. 9B is a block diagram of 12 possible arrangements of the 5 blocks depicted in FIG. 9A within a tier periphery.

Layout formation module 3218 then calculates candidate layouts by iteratively assigning feasible patterns to blocks within periphery 4002. Layout formation module 3218 first attempts to select one of the feasible patterns of containers to occupy a block 4004 at the bottom-right of the periphery 4002, shown in FIG. 9A. Layout formation module 3218 then select one of the patterns to occupy a top-right block 4006, then a bottom-left block 4008, then a top-left block 4010, then a fifth block 4012 in any remaining space. The blocks may vary in size, depending on the container patterns selected. In a given candidate layout, any of blocks 4006, 4008, 4010, 4012 may be omitted, depending on the sizes of the earlier-defined blocks. The process of calculating candidate layouts iterates through possible arrangements of patterns until a termination condition is met. FIG. 9B depicts twelve example layouts 4000-*a* through 4000-*l*, with the respective periphery 4002 and blocks 4004, 4006, 4008, 4010, 4012 of each arrangement, which would themselves contain patterns of containers 300, denoted by the letters a through l. Numerous other arrangements of blocks 4004, 4006, 4008, 4010, 4012 are possible.

Figure 9C:
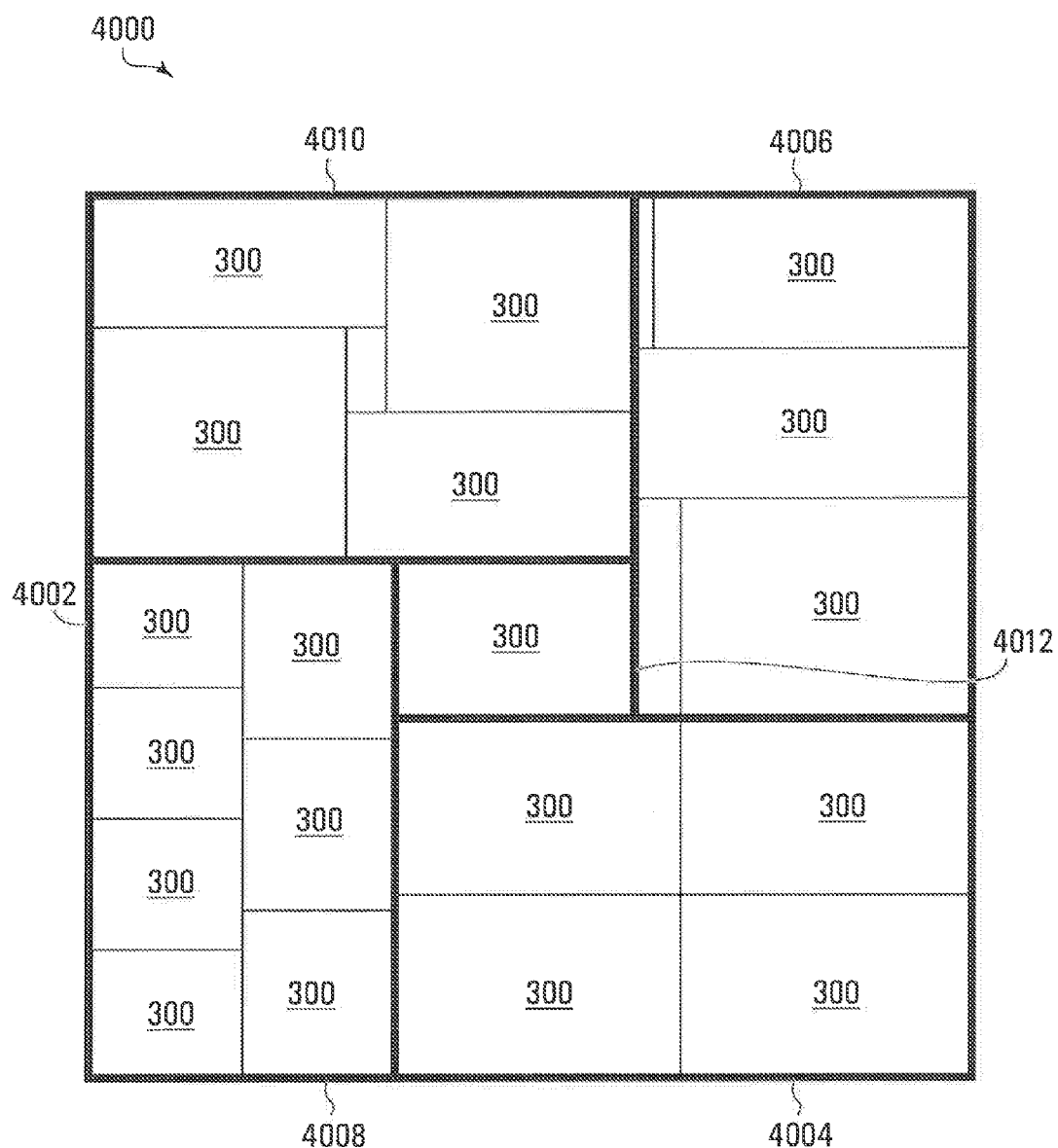
FIG. 9C is a block diagram of the 5-block arrangement of FIG. 9A, including container patterns fit within the blocks.

FIG. 9C depicts a possible arrangement of blocks 4004, 4006, 4008, 4010, 4012 showing possible patterns of containers that are formed within each of the blocks. All of the container patterns together make up the candidate tier layout 4000. As depicted in FIG. 9C, containers 300 in block 4010 form a pinwheel pattern and containers 300 in block 4004 form a grid pattern. Container edges in block 4008 align to define a guillotine cut, effectively partitioning the block into two sub-patterns Some patterns may leave extra space within their respective bounding rectangle. For example, block 4006 contains a linear strip of containers of different sizes, with extra space remaining on the left side of the block.

Layout formation module 3218 iteratively calculates a number of candidate tier layouts like layout 4000 and passes the layouts to candidate evaluation module 3222. Each candidate layout passed to candidate evaluation module 3222 identifies the ultimate position of each specific container 300, by container ID and buffer ID. As will be described in further detail hereinafter, the candidate layouts also include assignments of the containers to one or more rows, and define vertically extendible bars 1028 at which each container should be positioned during palletizing, and whether each container should be turned during palletizing.

Candidate evaluation module 3222 is programmed with at least one metric indicative of the quality of a candidate tier layout. The quality of a layout may depend on, for example, how well the layout fills the available space and how much available space it provides for subsequent tiers, its stability (that is, how secure the tier would be if built upon the underlying tier), and its contribution to the stability of the pallet (that is, how suitable the candidate tier layout is to support further stable tiers thereupon.

Candidate evaluation module 3222 may determine values for every candidate tier layout produced by layout formation module 3218 and select the candidate with the most favourable metrics. Alternatively, the evaluation module may measure candidate tier layouts until a candidate is found which has a certain threshold quality. Alternatively or additionally to these possibilities, the candidate evaluation module may operate for a fixed amount of time, at which point it will select the most favourable candidate measured.

Once a tier layout is selected, candidate evaluation module 3222 reports the selected layout to tier building module 3214.

In use, a plurality of containers 300 are picked from storage (for example, manually or using automated material handling equipment) and are delivered to conveyor 1002 by way of infeed conveyor 1004 (FIG. 2). Collectively, containers 300 may make up a shipment for a particular destination (e.g. a stock order for a store). Containers 300 may be accumulated in an area upstream of infeed conveyor 1004 and passed into the conveyor intermittently to fill available space in buffer cells 1010.

Each container 300 is passed along conveyor 1002 and passes gate 1006. Sensor 3002 associated with gate 1006 obtains measurements of the height, width and length of the container and reports the measurements to buffer management module 3210 of palletizing control block 3204. Buffer management module 3210 assigns a unique container identifier to the measured container and assigns the container to an available buffer cell 1010 in the buffering area 1008. The container dimensions and container ID are then written to a row associated with the assigned buffer cell in a buffer content table. A buffer cell 1010 is available unless a container is assigned to it and is not scheduled for release to pallet loader 1022. If no buffer cell 1010 is available, containers are held upstream of buffer cells 1010 until one or more cells become available.

Optionally, buffer management module 3210 may make slight adjustments to the measured dimensions of a container. For example, dimensions may be corrected to one of a number of predefined possible container types. In this way, small size differences (e.g. less than 0.5 inches in any dimension may be ignored). This may ease the layout optimization effort that occurs when the containers are palletized.

Meanwhile, each of conveyor controller 3001, buffer cell conveyor controller 3004 and auxiliary conveyor controller 3006 report the state of their respective conveyors at any given time. This enables the palletizing control application 3204 to track the position of any given container along conveyor 1002.

When a container reaches the buffer cell 1010 to which it is assigned, buffer management module 3210 causes a signal to be sent to buffer cell conveyor controller 3004 and auxiliary conveyor controller 3006 to cause buffer cell conveyor 1012 and auxiliary conveyor 1014 for that buffer cell to become active. For example, as depicted in FIG. 3, container 300 has been assigned to buffer cell 1010-2. Before or just as container 300 reaches position B, auxiliary conveyors 1014-2 and buffer cell conveyor 1012-2 receive signals causing the auxiliary conveyor to extend above the surface of conveyor 1002 and causing both the auxiliary conveyors 1014-2 and buffer cell conveyor 1012-2 to begin running in a direction to draw container 300 into its final position C in buffer cell 1010-2.

This process is repeated until a predetermined number of containers have been assigned to and stored in buffer cells 1010. Once a sufficient number of buffer cells have been filled, palletizing control block 3204 invokes pallet layout block 3206 to determine a suitable tier layout from the available containers (i.e. those in the buffer cells). In the depicted example, lane 1000 has 40 buffer cells and the pallet layout block 3206 is normally invoked when containers are assigned to all 40 buffer cells. The inventors have empirically determined that, for 40"×48" skids, and where containers 300 are cases of various bottled and canned beverages, layout formation module 3218 is typically able to arrive at a tier layout of satisfactory quality when it is provided with 40 or more containers to choose from. In some embodiments, pallet layout block 3206 may be invoked when containers are assigned to a certain subset of buffer cells 1010. For example, if a lane 1000 has 50 buffer cells but fewer than 50 containers are typically required to arrive at a layout of satisfactory quality, pallet layout block 3206 may be invoked before all of the buffer cells are assigned containers.

In certain situations, pallet layout block 3206 may be invoked with fewer than the predetermined number of containers assigned to buffer cells 1010. This may happen, for example, at the end of palletizing of a shipment, when less than the predetermined number of containers remain to be palletized.

However, the total number of buffer cells and the threshold number of assigned buffer cells at which pallet layout block 3206 is invoked may vary. In some applications, where containers 300 are relatively consistent in size, a smaller number may be required to arrive at a satisfactory tier layout.

Figure 10:
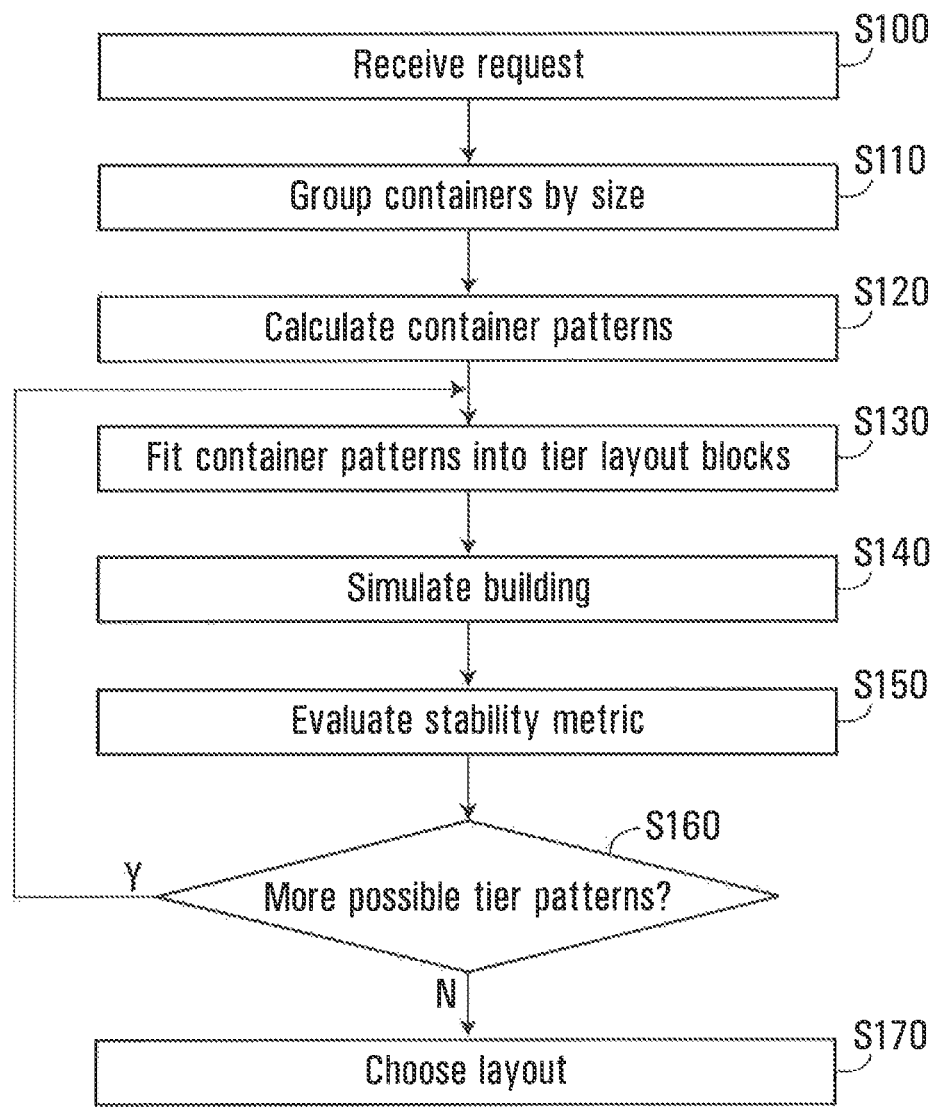
FIG. 10 is a flow chart of a method used by the control server of FIG. 5 to select a layout for a tier of a pallet.

FIG. 10 depicts a flow chart of the basic operations conducted by pallet layout block 3206 to determine a tier layout.

When buffer management module 3210 determines that a preset number of containers are assigned to buffer cells 1010 (FIG. 2), palletizing control block 3204 sends a request to pallet layout block 3206 to generate a tier layout for a first tier of containers to be loaded atop skid 200, using a subset of containers in buffer cells 1010. At block S100, the request is received by pallet layout block 3206.

Along with or subsequent to the request, pallet layout block 3206 obtains a container table, describing the containers 300 in buffer cells 1010, from buffer management module 3210. The container table contains a container ID and a buffer ID for each container. Pallet layout block 3206 also obtains the tier parameters, namely, the size of the tier periphery, from the tier parameter module. As noted above, for a bottom of a pallet, i.e. a tier to be built directly on skid 200, the periphery of the tier layout is defined by the length and width of the skid, plus any pre-programmed allowable overhang.

At block S110, layout formation module 3218 processes the contents of buffer cells 1010 in the provided table and groups containers having similar dimensions. In the depicted embodiment, containers are grouped by treating containers that are within 1.3 cm of one another in length or width or height as being the same in that dimension. Specifically, a set of normalized dimensions is added to the container table. The normalized dimensions of containers may be adjusted relative to the measured dimensions to match one another using a "fuzzy normalization" algorithm. Fuzzy normalization groups containers into container types by storing a delta array for each container 300 in a buffer cell 1010, describing how close that container is to every other container stored in a buffer cell 1010. The fuzzy normalization algorithm then selects the two containers that are closest in size and assigns normalized dimensions to the smaller of the containers by increasing its actual dimensions to match those of the larger container up to a predetermined maximum amount (in an example, 1.3 cm). The delta arrays are then updated using the normalized dimensions and the process repeats.

Throughout the process, the cumulative adjustment to each dimension of a container is tracked, so that no dimension is increased beyond the predetermined maximum. Thus, the fuzzy normalization process tends to cluster containers into groups having similar sizes. Containers that are similar in size and grouped may therefore be treated as a single container type—as if they are the same size. As will be appreciated, this may simplify the computation and selection of candidate tier layouts.

After the measured container dimensions are adjusted the containers 300 in buffer cells 1010 may be sorted into groups of containers having the same normalized size. For example, buffer cells 1010 may contain a first group of 4 containers having normalized length and width of 30 cm×40 cm and height of 20 cm, a second group of 6 containers having normalized length and width of 30 cm×40 cm and height of 30 cm and a third group of 5 containers having normalized length and width of 60 cm×40 cm and height of 30 cm. Each group has a container type, corresponding to the normalized dimensions of containers in that group.

In some embodiments, containers 300 in groups having less than a threshold number of members may be treated as singletons. Thus, in some cases, containers 300 of a specific size may be treated as singletons, i.e., as not belonging to a group, notwithstanding that more than one such container is present. For example, two containers having the same normalized size which are dissimilar in size to all other containers in buffers 1010 may be treated as singletons.

At block S120, layout formation module 3218 calculates possible container patterns of one or more containers using the reported contents of buffer cells 1010. The calculated possible container patterns are later used to calculate candidate tier layouts 4000 by using calculated container patterns to define blocks 4004, 4006, 4008, 4010 and 4012 of tier layouts 4000 (FIG. 9A).

Figure 11:
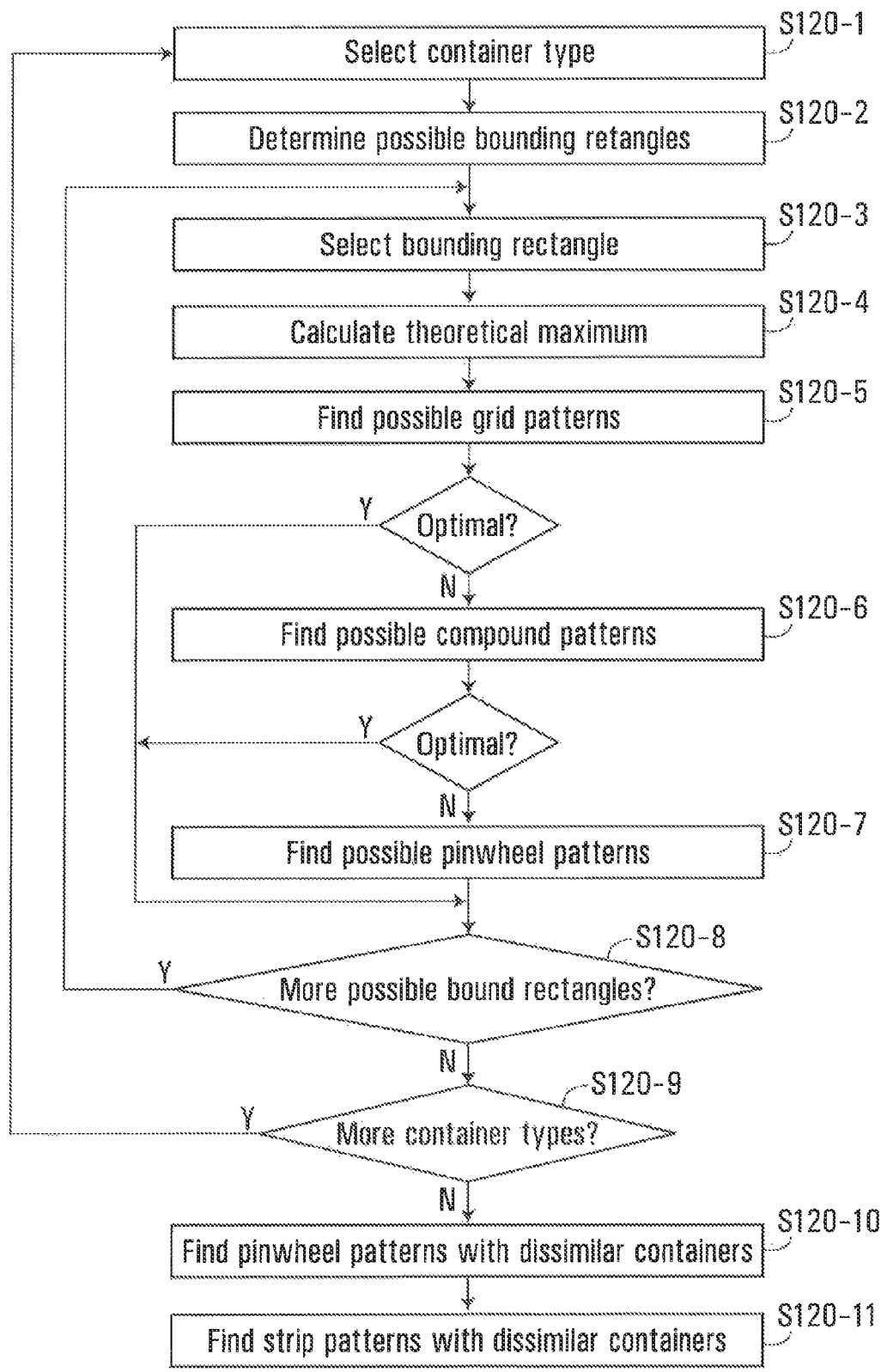
FIG. 11 is a flow chart of a method used by the control server of FIG. 5 to calculate candidate container patterns for obtaining candidate layouts for a tier of a pallet.

FIG. 11 depicts the process used by layout formation module 3218 to calculate possible container patterns.

Layout formation module 3218 first calculates possible patterns made up of containers having the same normalized size, as identified in the container table. That is, for each group of containers in buffer cells 1010 having the same normalized size, the layout formation module calculates possible permutations for arranging those containers in one or more rectangular patterns.

At block S120-1, the first group of same-size containers identified in the container table is selected. At step S120-2, layout formation module 3218 determines feasible rectangular bounding boxes for the patterns formed of containers in the first group. For a container type having length l and width w, the possible bounding rectangles may have dimensions (length or width) of (m×l)+(n×w), where m and n are non-negative integers, one, but not both, of which may be zero, and which add up to no more than the number of containers in the group, and where the bounding rectangle is large enough to hold at least one container and fits within the maximum tier layout size determined by tier parameter module 3212.

For, example, a group of three 40 cm×30 cm containers and a maximum tier size of 101.6 cm×121.9 cm (corresponding to a 40"×48" skid 200), bounding rectangles combinations of lengths and widths of 30 cm, 40 cm, 60 cm, 70 cm, 80 cm, 90 cm, 100 cm, 110 cm and 120 cm which satisfy the above rules.

Once feasible bounding rectangles are determined, the layout formation module 3218 attempts to find the optimal pattern of containers in the group (i.e. of the container type under investigation) for each feasible bounding rectangle.

The bounding rectangles are examined in increasing order of size. Thus, the results of calculating small optimal patterns may be used in calculating larger optimal patterns—for example, a small optimal pattern which has already been identified may be used as a sub-pattern within a larger bounding rectangle.

At block S120-3, a bounding rectangle is selected. At block S120-4, the theoretical maximum number of containers which may fit inside the bounding rectangle is calculated, being the quotient of the bounding rectangle's area divided by the container area. As will be appreciated, in some instances, one or more patterns may fit the theoretical maximum number of containers within the bounding box, while in others, the theoretical maximum may not be possible.

At blocks S120-5 through S120-9, layout formation module 3218 examines the possible patterns of containers currently in buffer cells 1010 which fit into the bounding rectangle. Throughout these steps, layout formation module 3218 maintains a record of the preferred pattern for the bounding rectangle under consideration, that being the pattern which includes the largest number of containers, as well as which containers would remain in buffer cells 1010, as patterns for a bounding rectangle are constructed. For each bounding rectangle, the preferred pattern is intialized as a null pattern. At any point, if a pattern is calculated which contains more containers than the preferred pattern, the newly-identified pattern is selected as the preferred pattern. If at any point, a pattern is calculated which includes the theoretical maximum number of containers, that pattern is identified as the optimal pattern for that bounding rectangle and the layout formation module 3218 moves to the next bounding rectangle and container type. If no pattern includes the theoretical maximum number of containers, then the pattern marked as preferred once all possible patterns have been investigated is considered to be the optimal pattern for that bounding rectangle and container type.

Layout formation module 3218 maintains a pattern database, containing definitions of feasible patterns, searchable by the container type and the dimensions of the bounding rectangle, which will be later used at block S130 (FIG. 10) to form blocks 4004, 4006, 4008, 4010, 4012 of candidate layouts 4000. The optimal pattern identified at blocks S120-5 through S120-9 for each bounding rectangle size and container type is written to the pattern database.

Since blocks S120-5 through S120-9 are performed for each feasible bounding rectangle, in increasing order of size, and the identified optimal patterns are recorded in the pattern database, as blocks S120-5 through S120-9 are performed for a given container type and bounding rectangle size, layout formation module 3218 has access to previously-identified optimal patterns for smaller bounding rectangles. These previously-identified optimal patterns may be used in the calculation of compound or pinwheel patterns.

At block S120-5, layout formation module 3218 calculates possible permutations of fitting containers into the bounding rectangle in a grid pattern (FIG. 8A) using available containers of the container type under consideration in buffer cells 1010. The layout formation module first calculates the number of containers in a grid with the lengthwise dimension of the containers parallel to the lengthwise dimension of the bounding rectangle. Layout formation module 3218 then calculates the number of containers in a grid with the widthwise dimension of the containers parallel to the lengthwise dimension of the bounding rectangle.

If no grid pattern includes the theoretical maximum number of containers, layout formation module 3218 moves to block S120-6, where it investigates possible compound patterns. To form compound patterns, the bounding rectangle is partitioned to form two smaller rectangles. Grid patterns are then investigated for each of the smaller rectangles. The bounding rectangle is first partitioned parallel to the lengthwise dimension, and then parallel to the widthwise dimension. For example, as depicted in FIG. 12A, a bounding rectangle 5000 is partitioned lengthwise by line a-a. In FIG. 12B, bounding rectangle 5000 is partitioned widthwise by line b-b. The size of the partition may correspond to the width of a container 300, as in FIG. 12A, or to the length of a container 300, as in FIG. 12b. Possibly, partitioning may divide a bounding rectangle into two smaller rectangles, one or both of which corresponds in size to a smaller bounding rectangle for which an optimal pattern has already been identified. If so, pallet layout module 3218 may simply retrieve the previously-calculated optimal pattern, rather than re-calculating the optimal pattern.

If no compound pattern includes the theoretical maximum number of containers, layout formation module 3218 moves to block S120-6, where it investigates possible pinwheel patterns.

As depicted in FIG. 13, a pinwheel pattern is one with four smaller rectangles 5001, 5003, 5005, 5007 defined within the bounding rectangle 5000, each of which contains one or more containers 300. The x-dimension and y-dimensions of rectangle 5001, at the bottom-left of the pinwheel pattern, may be any value up to the limits of bounding rectangle 5000, less the length of the shorter side of one container 300. The x-dimension of the top-right rectangle 5003 must be more than the X-dimension of bounding rectangle 5000, less the X-dimension of rectangle 5001, and must be less than the X-dimension of bounding rectangle 5000, less the length of the shorter side of one container 300. The Y-dimension of rectangle 5003 may be any dimension up to the Y-dimension of bounding rectangle 5000, less the Y-dimension of rectangle 5001. Thus, rectangles 5001, 5003 overlap in the X-axis but not the Y-axis. The X-dimension of top left rectangle 5005 may be up to the X-dimension of the bounding rectangle, less that of rectangle 5003. The Y-dimension of rectangle 5005 may be up to the Y-dimension of bounding rectangle 5000, less that of rectangle 5001. The X-dimension of bottom-right rectangle 5007 may be up to that of the bounding rectangle, less that of rectangle 5001, and the Y-dimension of the top right rectangle 5003 may be up to that of bounding rectangle, less that of rectangle 5003.

Within the above limits, the X and Y dimensions may be (m×l)+(n×w), where m and n are non-negative integers, one, but not both of which may be zero and l and w are the length and width, respectively, of a container.

After defining possible sizes for rectangles 5001, 5003, 5005, 5007, layout formation module 3218 iterates through the identified possibilities, and for each permutation, calculates possible patterns of containers of the size under consideration within rectangles 5001, 5003, 5005, 5007 according to the above-described approaches for fitting grid patterns. If any of rectangles 5001, 5003, 5005, 5007 are the same size as a bounding rectangle for which an optimal pattern has been calculated, that optimal pattern may be retrieved from the pattern database to fill the rectangle. For example, as depicted, rectangle 5003 is populated with a previously-calculated optimal 1×2 pattern of containers 300.

When blocks S120-5, S120-6 and S120-7 have been completed for a particular container type and bounding rectangle size, all of the feasible grid patterns, compound grid patterns and pinwheel patterns have been investigated for that specific container type and bounding rectangle size.

As noted, throughout the process, layout formation module 3218 maintains a running record of the preferred pattern for the container type and bounding rectangle size. When blocks S120-5, S120-6 and S120-7 have been completed, the preferred pattern is selected as the optimal pattern for that combination of container size and bounding rectangle size. The optimal pattern is stored as a record in a table of the pattern database, with the record identifying the container type, bounding rectangle size, and the positions of the containers in the pattern.

Layout formation module 3218 then moves to block S120-8 and determines if any further feasible bounding rectangle sizes exist for patterns of the selected container type. If so, the process returns to block S120-3 and the next bounding rectangle size is selected. If no further bounding rectangle sizes remain to be investigated for the selected container type, layout formation module 3218 moves to block S120-9 at which layout formation module 3218 determines whether any more groups of same-size containers remain to be investigated. If so, layout formation module 3218 returns to block S120-1 and repeats with the group of the next container type.

At the conclusion of iterating through each container type (i.e. each group of same size containers), as outlined above, the pattern database includes a table for each container type, with each row of the table defining a particular bounding rectangle size and the identified optimal pattern of containers for that size.

Once all groups of same-size containers have been investigated and only singleton containers of dissimilar types remain, layout formation module 3218 moves to block S120-10 and S120-11, in which the layout formation module 3218 attempts to calculate feasible patterns for dissimilar container types. At step S120-10, layout formation module 3218 calculates feasible pinwheel patterns from the remaining dissimilar containers. The rules applied to calculate pinwheel patterns of dissimilar containers are similar to those described above with reference to block S120-6, except that patterns are limited to four containers, one anchored at each corner of a bounding rectangle. Pinwheel patterns occupying different bounding rectangles are iteratively identified, up to a predefined maximum bounding rectangle size, for example, 50% of the area of periphery 4002.

At step S120-11, the layout formation module 3218 calculates possible linear strip patterns. Linear strip patterns are calculated by iteratively calculating all possible rows of dissimilar-sized containers sharing at least one normalized dimension are arranged, with the sides of matching dimensions abutting one another. The size of linear strip patterns is limited to a predefined maximum, for example, 50% of the area of periphery 4002.

At the conclusion of block S120, the pattern database contains a table for each container type, with each row of the table defining a particular bounding rectangle size and the identified optimal pattern of containers for that size, and a table for patterns of mixed types, each row likewise defining a bounding rectangle size and location of blocks within that rectangle. Rows for patterns of mixed container types also specify the height variation of containers within the pattern. Mixed-container patterns with more than a threshold height variance are identified as top-only patterns and may not be used in candidate layouts for non-top tiers.

As will be appreciated by those skilled in the art, the above-described process is computationally intensive. Conveniently, if the range of possible container types is known (for example, the inventory of products shipped from a distribution centre may be known), the possible bounding rectangles and corresponding optimal container patterns for patterns of similar-sized containers of each type may be pre-calculated and stored. This may reduce the time and number of computations required to find a tier layout for a given set of containers in buffer cells 1010. If optimal patterns are pre-calculated in this manner, the pallet layout module 3218 need not calculate optimal container patterns, and may instead simply look up the optimal patterns for each container type and bounding rectangle size.

Turning back to FIG. 10, once a set of possible container patterns have been calculated at block S120, pallet layout module 3218 moves to block S130 and attempts to find possible tier layouts.

Candidate tier layouts are iteratively calculated using the calculated patterns in the pattern database. As is shown in FIG. 9A, each candidate tier layout 4000 has up to five blocks 4004, 4006, 4008, 4010, 4012, each of which contains a pattern of containers previously calculated at block S120 and stored in the pattern database. Using the information in the container table, pallet layout module 3218 maintains a count of the available number of containers of each type (initially, the number of containers of each type in buffer cells 1010). This count is decremented each time a pattern is selected to define a block of a candidate tier layout, and subsequently, pallet layout module 3218 considers only patterns for which an adequate number of containers are available. The count is reset for each candidate tier layout.

Prior to calculating candidate tier layouts, pallet layout module 3218 determines whether the tier in question may be a top tier of a pallet. The determination of whether a particular tier could be a top tier is based on the height of the underlying tiers as compared to a predefined maximum height for a finished pallet: if the underlying tiers are close to the maximum height, the in-progress tier could be a top tier.

Once it is determined whether the in-progress tier may be a top tier, pallet layout module 3218 first selects a pattern from the pattern database to form block 4004, anchored to the bottom-right corner of the tier periphery 4002. The pattern selected must be large enough to occupy at least one half of the width and one half of the length of the tier periphery 4002.

Once a pattern has been selected to define block 4004, pallet layout module 3218 attempts to select a pattern to define block 4006, anchored to the top-left corner of tier periphery 4002. Pallet layout module 3218 then attempts to select a pattern to define block 4008, anchored to the bottom-right corner of tier periphery 4002, then attempts to select a pattern to define block 4010, anchored to the top-right corner of tier periphery 4002, then attempts to select a pattern to define block 4012 in any remaining space not within the defined blocks 4004, 4006, 4008, 4010. At each of these steps, the selected pattern may occupy any portion of the remaining space not yet taken up by a defined block. Patterns are selected from among those for which the remaining count of available containers is sufficient. If the in-progress tier is not a top tier, the height variance between all blocks of a candidate layout must be below a predetermined threshold value. Thus, once a first pattern is selected to form block 4004, other patterns which differ in height by more than the threshold value are ignored. In addition, patterns of mixed container types which the pattern database identifies as top-only patterns may not be used in non-top tiers. Conversely, if the in-progress tier may be a top tier, all patterns are considered. No upper size limit is imposed on any of blocks 4004, 4006, 4008, 4010, 4012, other than the maximum tier size. Accordingly, in any particular candidate layout, any of the blocks 4006, 4008, 4010, 4012 may be omitted, if the earlier-defined blocks are large enough that no available pattern can fit in the space remaining in tier periphery 4002. However, block 4004 is present in every candidate layout.

Pallet layout module 3218 repeats this selection process to attempt to identify all possible combinations of patterns defining blocks 4004, 4006, 4008, 4010, 4012. Calculation of candidate tier layouts continues until a termination condition is reached. Possible termination conditions include: exhaustion of possible candidate tier layout; reaching a threshold number of candidates; reaching a time limit; and identifying a candidate that meets predefined quality criteria.

As noted, block 4004 is subject to a lower size limit of half the length and half the width of tier periphery 4002. This may avoid calculation of candidate layouts which are mirror images of one another and therefore may reduce computational load. Pallet layout module 3218 may be programmed to relax this lower size limit if insufficient candidates exist for block 4004. For example, in one embodiment, if insufficient candidates exist, pallet layout module 3218 may relax the lower size limit so that only one of the width or length of block 4004 need be at least half that of tier periphery 4002. If this fails to yield sufficient candidates, pallet layout module 3218 may disregard the lower size limit entirely.

Each candidate layout calculated by layout module 3218 is also evaluated by candidate evaluation module 3222.

Due to the mechanical design of pallet loader 1022, it may not be possible to build a pallet tier which exactly matches a given candidate layout calculated by pallet layout module 3218. When a tier is built according to a selected layout, containers in the layout may be shifted from their calculated positions. Accordingly, prior to evaluating the candidate tier layouts, at block S140, pallet layout module 3218 simulates building of each candidate tier layout by estimating the final position of each container after building. The simulated as-built layouts are stored for evaluation, and ultimately, selection of one of the candidates.

For example, pallet loader 1022 constructs tiers 400 row-by-row. That is, each container 300 in a tier is assigned to a row, and the rows are assembled and transferred one at a time. Transferring of later rows may move containers in earlier rows, as containers abut and cause one another to move. Rows are therefore assigned beginning with containers which are calculated to be farthest from row transfer bar 1030, with each row including those containers which would contact the containers in the preceding row when moved by transfer bar 1030, and the first row including those containers which would not contact any other containers. Thus, if pallet loader 1022 transfers containers from left-to-right, the first row of a candidate layout includes those containers with no other containers to their right edges. Each subsequent row includes the containers whose right edges would contact the containers of the preceding row.

Moreover, while candidate layouts may be calculated with containers in any position, vertically extendible bars 1028 of pallet loader 1022 can only stop containers in a finite number of discrete locations along the width of the pallet. Pallet layout module 3218 calculates, for each container 300 in a candidate layout, the vertically extendible bar 1028 that corresponds most closely to the container's assigned position, while leaving at least a predetermined amount of clearance from adjacent containers to avoid containers binding on one another.

Accordingly, during building, the containers may be moved slightly from the position specified in the candidate tier layout. After containers are transferred to apron 1024 of the pallet loader 1022, they may be compressed together by squeezer bars 1032, or they may be justified to one edge of the skid 200. The simulation algorithm approximates this squeezing after determining row and vertically extendible bar assignments for each container. In the depicted embodiment, squeezer bars 1032 compress containers together in the widthwise dimension of skid 200. However, in other embodiments, other pallet loaders may be configured to compress containers both widthwise and lengthwise.

Once candidate layouts are calculated and the building of tiers according to those candidate layouts simulated, at block S150 (FIG. 10), candidate evaluation module 3222 conducts an evaluation of the candidate layouts to select a candidate to be built.

Candidate layouts are evaluated to determine their stability and packing efficiency. Stability may refer to the stability of a candidate tier atop the underlying tiers, or to the suitability of a candidate tier for stably supporting further tiers, or both. Candidate layouts are evaluated according to one of two stability metrics, based on whether the candidate layout is a candidate for a top tier or a candidate for a non-top tier. Each stability metric may contain one or more of the following ratios:

i. Area fill ratio—defined as the ratio of the total top surface area of all containers in a candidate layout to the theoretical maximum surface area of the tier;

ii. Area outside ratio—defined as the ratio of the theoretical maximum size of a subsequent tier to the theoretical maximum size of the candidate tier;

iii. Container overlap ratio—defined for each container in a candidate layout as the proportion of the container that is supported by (overlying) one or more containers in the preceding tier;

iv. Average container overlap ratio—defined as the arithmetic average of container overlap ratios in a candidate layout;

v. Container density ratio—defined as the ratio of the total top surface area of all containers in the candidate layout to the surface area of the smallest rectangle which circumscribes the containers in the candidate layout;

vi. Height variation ratio—a measure of the "bumpiness" of a candidate tier, defined as ratio of the amount of variation of height in containers of a candidate layout to the maximum allowed variation;

vii. Volume utilization ratio (non top tier)—defined as the ratio of the total volume of containers in the candidate layout, plus the theoretical maximum area of a subsequent tier, multiplied by the remaining height up to the pallet maximum;

viii. Volume utilization ratio (top tier)—defined as the ratio of the total volume of containers in the candidate layout to the theoretical maximum volume of the tier (max length×max width×max height)

Some or all of the above ratios may be combined to define a candidate layout stability metric for a non-top tier, and a candidate layout stability metric for a top tier. Ratios vi, and vii may not be relevant, and thus may be excluded, from a metric for a top tier. On the other hand, ratio viii may not be relevant and therefore may be excluded from a metric for a non-top tier.

The layout stability metrics may be a simple sum of the calculated ratios. Alternatively, the layout stability metrics may be a weighted sum of the calculated ratios. Additionally or alternatively, the layout stability metrics may be scaled such that, for each of the measured ratios, a value above a certain minimum value results in a perfect score.

Additionally or alternatively, a base threshold may be set for each ratio or for the layout stability metrics such that a value below a certain pre-determined minimum will result in rejection of the candidate pattern. For example, a minimum value may be prescribed for the container overlap ratio, as too low a value for this ratio suggests a number of containers that are not well supported by the underlying tier, suggesting that the candidate layout may be prone to collapsing.

As candidate tier layouts are evaluated, candidate evaluation module 3222 maintains a running tally of the highest value of the stability metric (if applicable, both the highest top-tier and non top-tier values), and of the associated candidate layout.

In an embodiment, calculation of candidate layouts is performed in one or more processing threads, and evaluation of the candidates is performed on the fly, as candidates are calculated. In this embodiment, a running tally of the highest top-tier and non top-tier values of the tier stability metric and the layouts associated therewith. Once all threads finish executing, the highest-value candidate is recorded for each thread, and the "best" candidate of the resulting set is chosen in block S170 as set out below.

In another embodiment, as pallet layout module 3218 iterates, each calculated candidate layout is recorded in a database table. At the conclusion of block S130, the database table contains a set of all feasible candidate layouts calculated by the pallet layout module.

At block S170 (FIG. 10), once all candidate tiers have been evaluated, candidate evaluation module 3222 selects the "best" candidate. If only top-tier or only non top-tier candidates are calculated and evaluated, the "best" candidate is that with the highest stability metric value. For cases in which both top-tier and non top-tier candidates are calculated and evaluated, candidate evaluation module 3222 chooses between the best top-tier candidate and the best non top-tier candidate. Such choice is made by comparing the volume of all containers in the top-tier candidate to the volume in all containers of the non top-tier candidate, plus an estimate of the volume of containers that could be fit in a subsequent tier above the non top-tier candidate. If the latter value is larger, the non top-tier candidate is selected as the best candidate.

When the candidate layout is selected, candidate evaluation module 3222 sends the layout to tier building module 3214 (FIG. 7). The selected layout is returned in the form of a data array which specifies the container ID of each container 300 in the layout, as well as the precise order in which the containers are to be conveyed to the pallet loader, and rows in which the tier is to be formed. For each container, the layout also specifies the orientation of the container 300 (i.e., whether the container needs to be turned), and the vertically extendible bar 1028 (FIG. 4) at which the container should be stopped.

Figure 14:
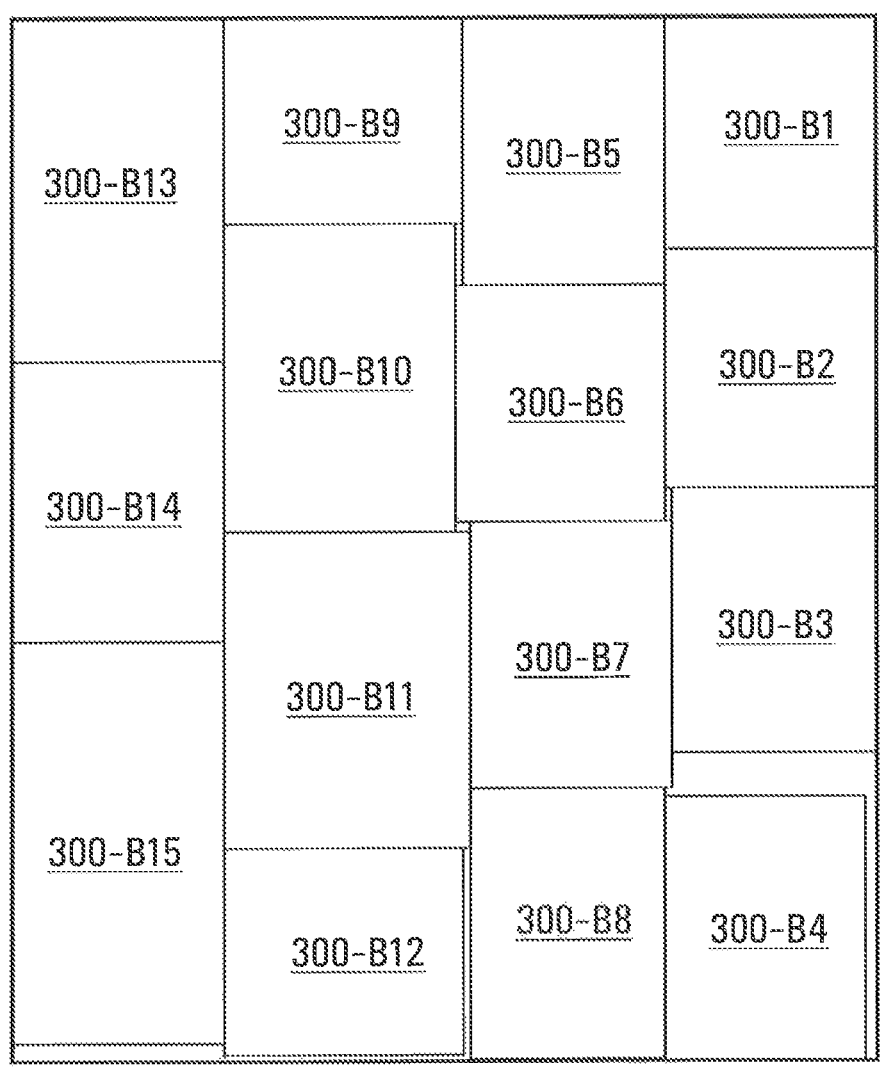
FIG. 14 is a schematic diagram of a selected layout for a bottom tier of the pallet of FIG. 1.

Tier building module 3214 causes a subset of the buffered containers in buffer cells 1010 corresponding to those in selected candidate layout to be released. In particular, buffer cells 1010 are directed to sequentially release containers 300 in that subset in the specified order for the selected layout, and causes pallet loader 1022 to construct a tier row-by-row according to the layout. For example, FIG. 14 depicts a layout for tier 400-1 of pallet 100 (FIG. 1). The layout for tier 400-1 specifies the order in which its constituent containers are to arrive at pallet loader 1022, namely, 300-B1, 300-B2, 300-B3, 300-B4, 300-B5, 300-B6, 300-B7, 300-B8, 300-B9, 300-B10, 300-B11, 300-B12, 300-B13, 300-B14, 300-B15. The layout further groups the containers into rows. Containers 300-B1 through 300-B4 make up a first row, containers 300-B5 through 300-B8 make up a second row, containers 300-B9 through 300-B12 make up a third row, and containers 300-B13 through 300-B14 make up a fourth row.

Once a layout is received which requires a given container 300 assigned to a buffer cell 1010, palletizing control application, schedules the container for release. At the same time, buffer management module 3210 marks the corresponding buffer as available, allowing subsequent containers to be assigned to it. However, as there may be a delay before the container is physically released from the buffer cell 1010, any subsequent container assigned to that buffer cell is held back until the previous container is physically released.

Tier 400-1 is constructed by sequentially releasing containers 300-B1 through 300-B15 which make up the tier. The containers are assembled and palletized row-by-row.

FIGS. 15A-15F depict the process of building tier 400-1 using pallet loader 1022.

Figure 15A:
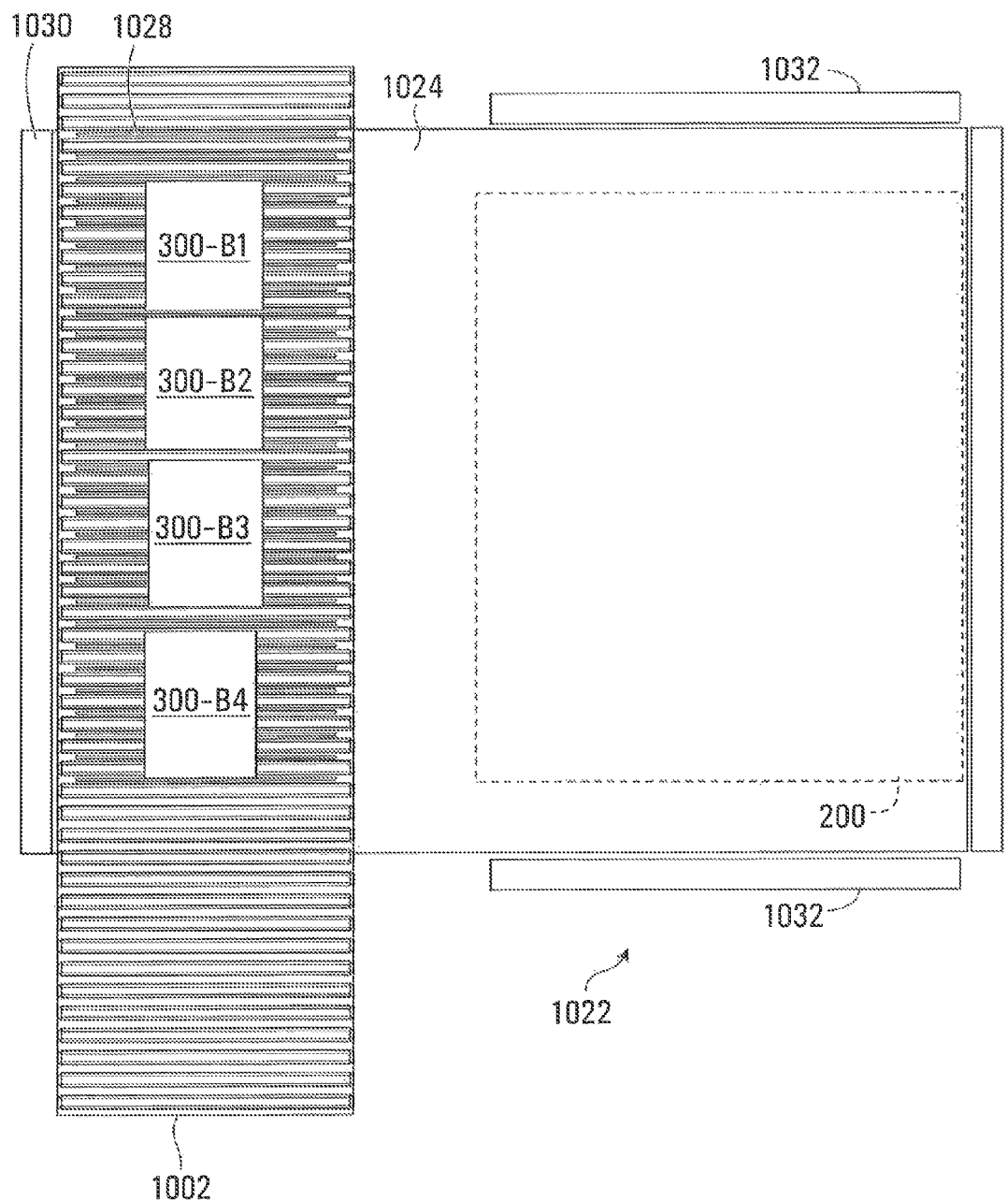
FIGS. 15A to 15F are schematic diagrams depicting stages of building a tier according to the layout of FIG. 14 using the pallet loader of FIG. 4.
Figure 15B:
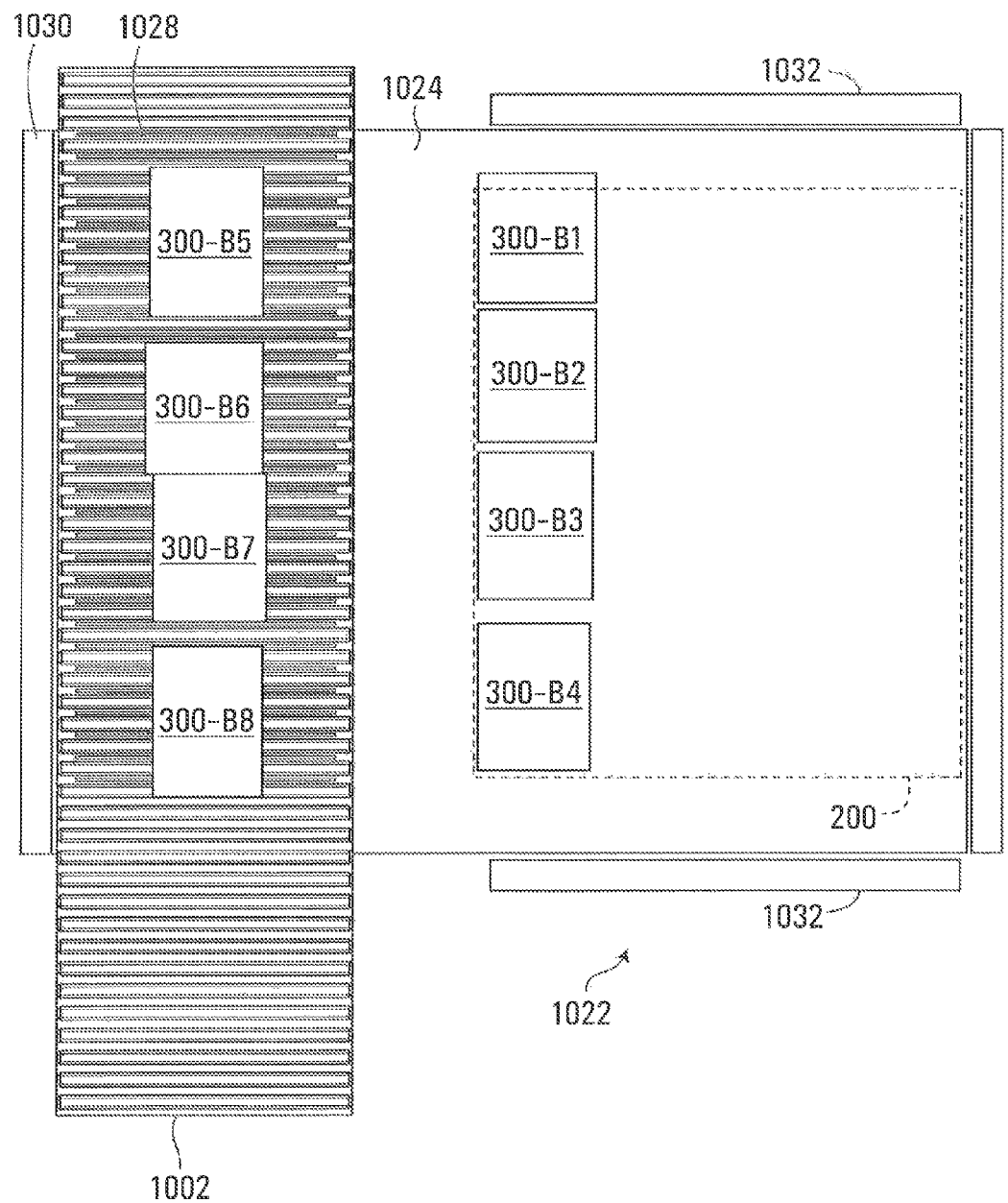
Figure 15C:
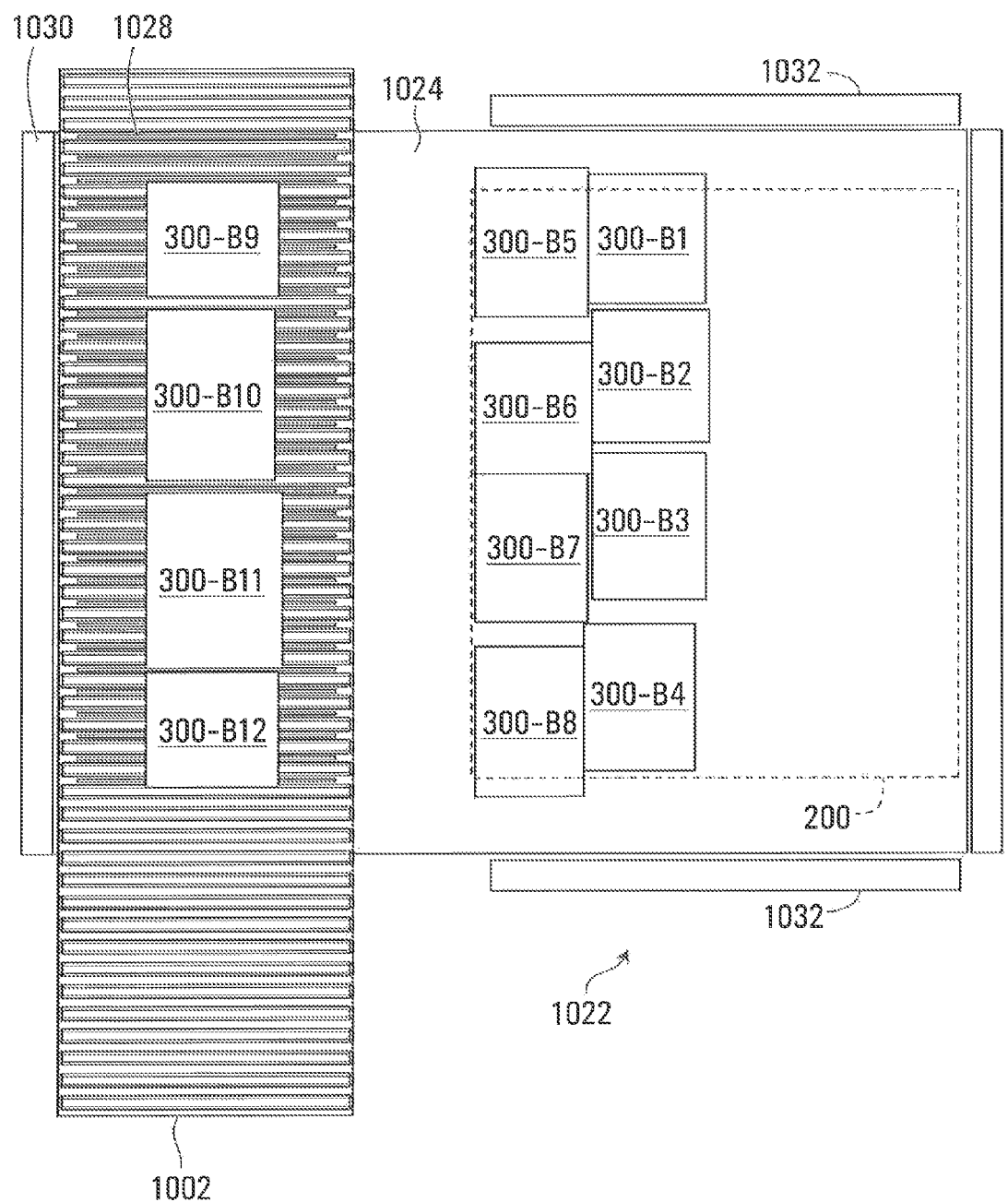
Figure 15D:
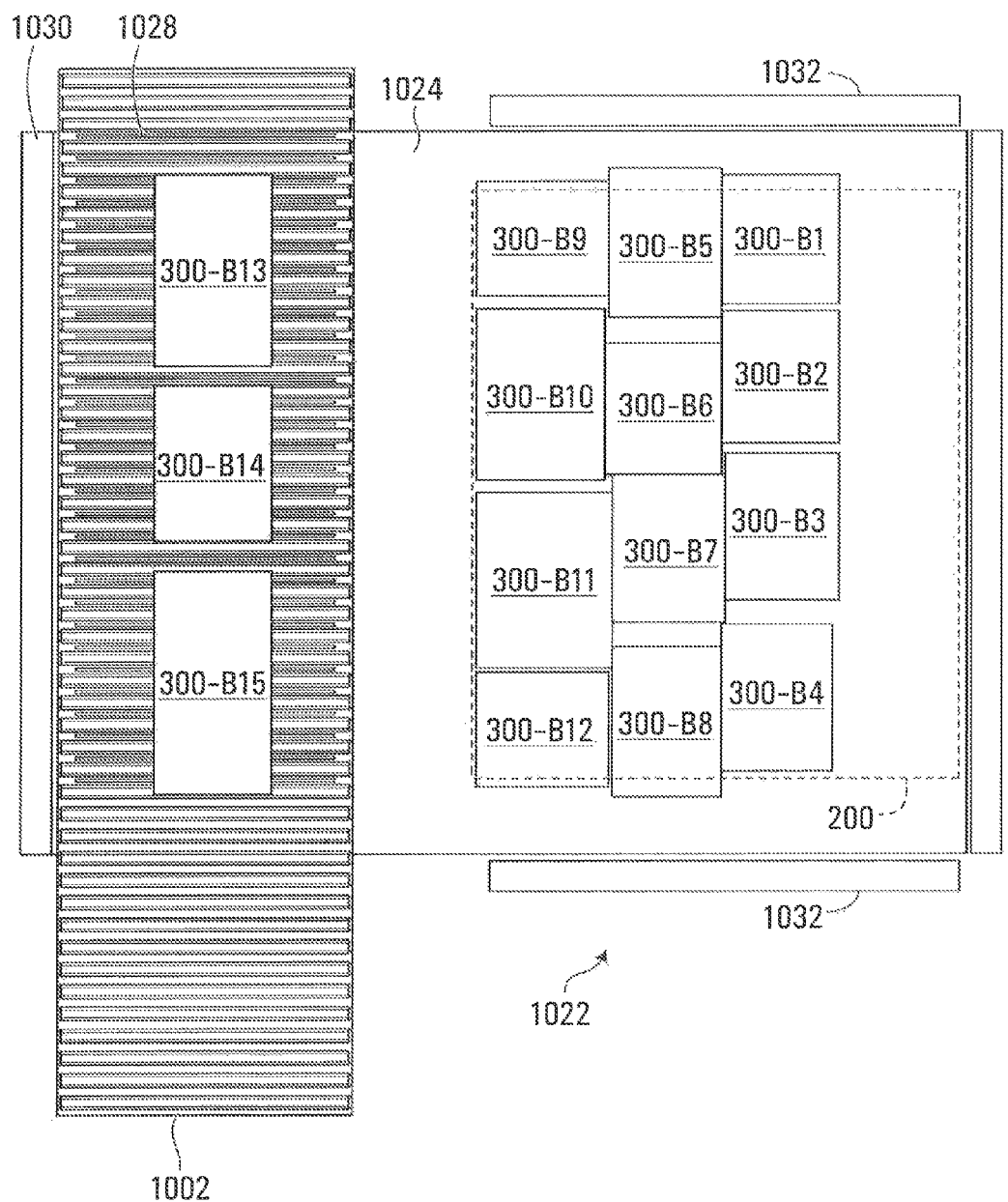

As is shown in FIG. 15A, containers 300-B1 through 300-B4 are released from their respective buffer cells 1010 and conveyed to pallet loader 1022. In some embodiments, containers 300 are conveyed serially, so that only one container is on conveyor 1002 at any given time. In other embodiments, containers 300 are conveyed in parallel, that is, with multiple containers simultaneously on conveyor 1002. When containers 300 are conveyed in parallel, the release of conveyors 300 from their respective buffer cells 1010 is timed such that the containers 300 arrive at pallet loader in the desired order. In the depicted example, the containers must arrive at pallet loader 1022 in numerical order, namely, 300-B1, 300-B2, 300-B3, 300-B4 for the first row. Accordingly, the release of a given container 300 onto conveyor 1002 does not occur until all preceding containers have physically passed the buffer cell 1010 in which that container is stored. In other words, container 300-B4 is not released onto conveyor 1002 until containers 300-B1, 300-B2 and 300-B3 have passed the buffer cell 1010 in which container 300-B4 is stored. If that buffer cell 1010 is closer to pallet loader 1022 than the buffer cell 1010 in which one or more of containers 300-B1, 300-B2 or 300-B3 is stored, the release of container 300-B4 must occur after the release of those other containers. Such delay may be achieved by use of a timer calibrated to approximate the time required for the other containers to pass, or by measuring the positions of the containers (e.g. optically, or by measuring the position of conveyor 1002). and are stopped at the appropriate indexing bars 1028. The containers are then transferred to apron 1024 by row transfer bar 1030 which extends a predetermined distance to justify the edge of the in-progress row of containers 300 to the edge of the pallet 200. Next, as shown in FIGS. 15B, 15C and 15D, containers 300-B5 through 300-B8, then containers 300-B9 through 300-B12, then containers 300-B13 through 300-B15 are released, stopped with the appropriate indexing bars 1028, and transferred by row transfer bar 1030. As each successive row is pushed into alignment with skid 200 by row transfer bar 1030, the containers in turn push the containers of preceding rows further away from conveyor 1002.

Figure 15E:
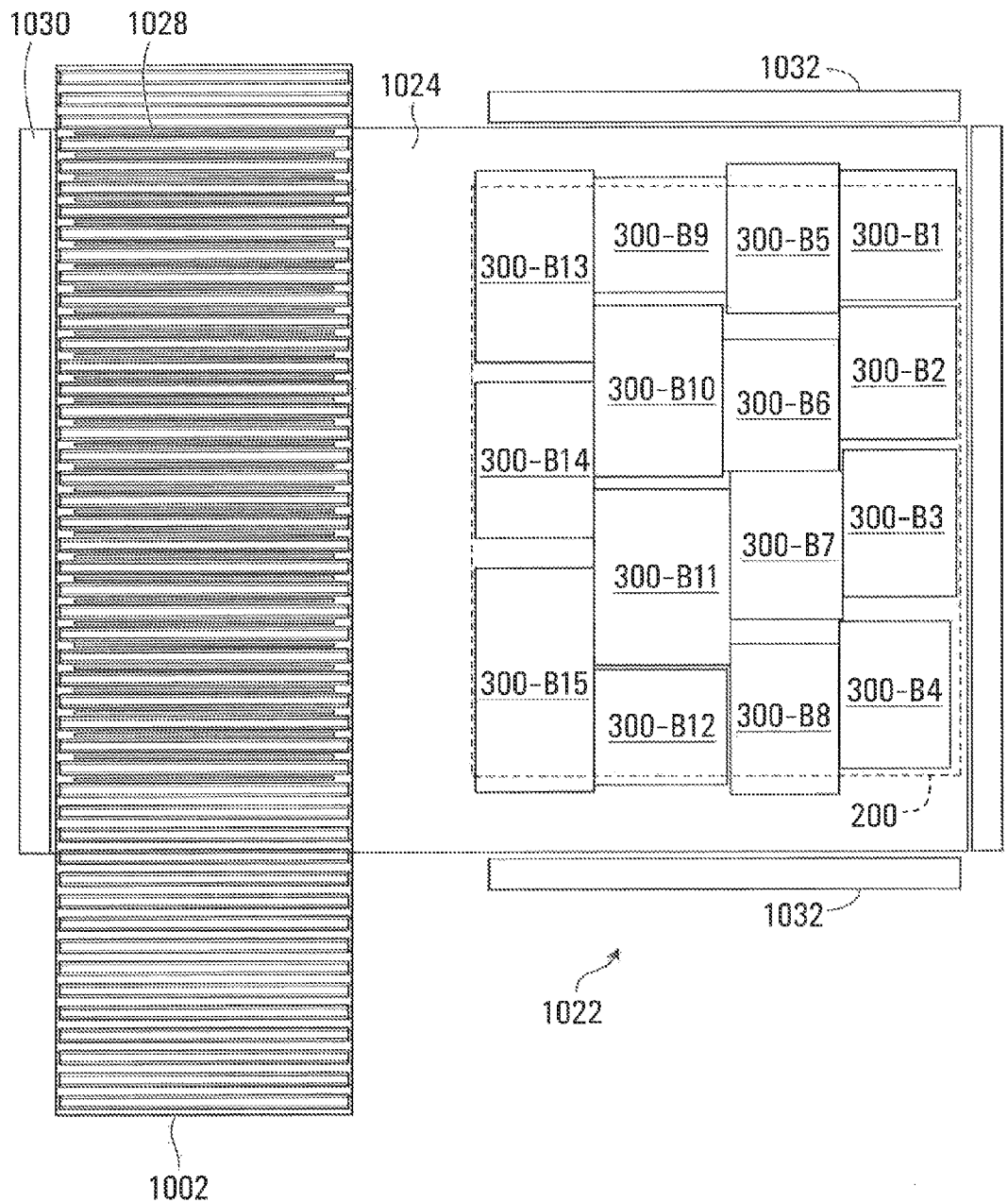
Figure 15F:
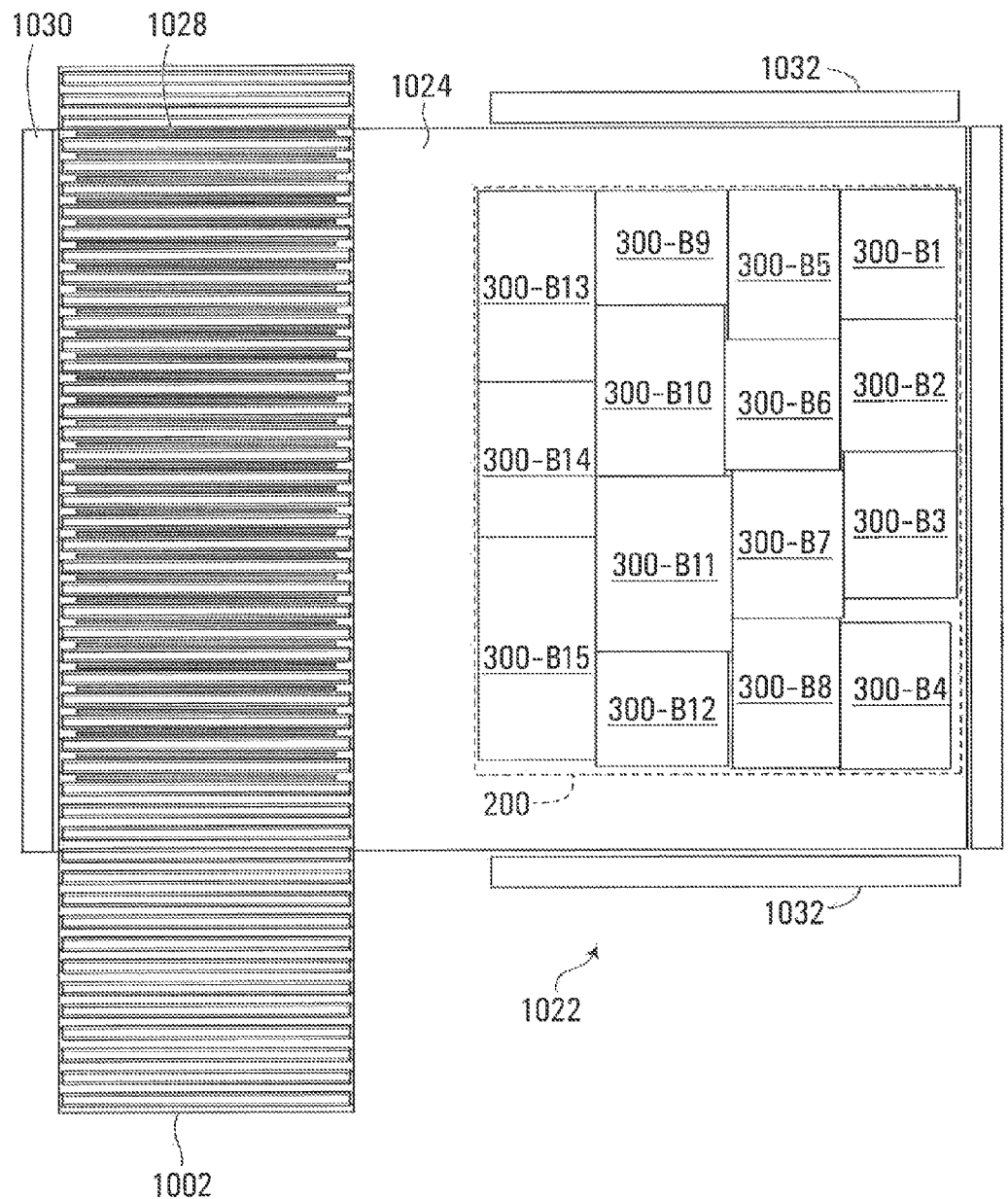

After all of containers 300 have been transferred to apron 1024, the containers are squeezed into a margin over skid 200, as shown in FIG. 15E. Specifically, row transfer bar 1030 extends to justify the containers to the left edge of skid 200, and squeezer bars 1032 extend symmetrically to push the containers at least within the top and bottom limits of skid 200. In an embodiment, squeezer bars 1032 symmetrically extend inwardly until either they reach a predefined limit of travel, or they encounter a predetermined resistance, indicative of containers 300 abutting one another. Apron 1024 is then withdrawn, allowing the containers to fall onto skid 200. Tier 400-1 may be secured with straps or wrapping before the apron is withdrawn. Once a pallet is completed, the completed pallet may also be secured with straps or wrapping.

Figure 16:
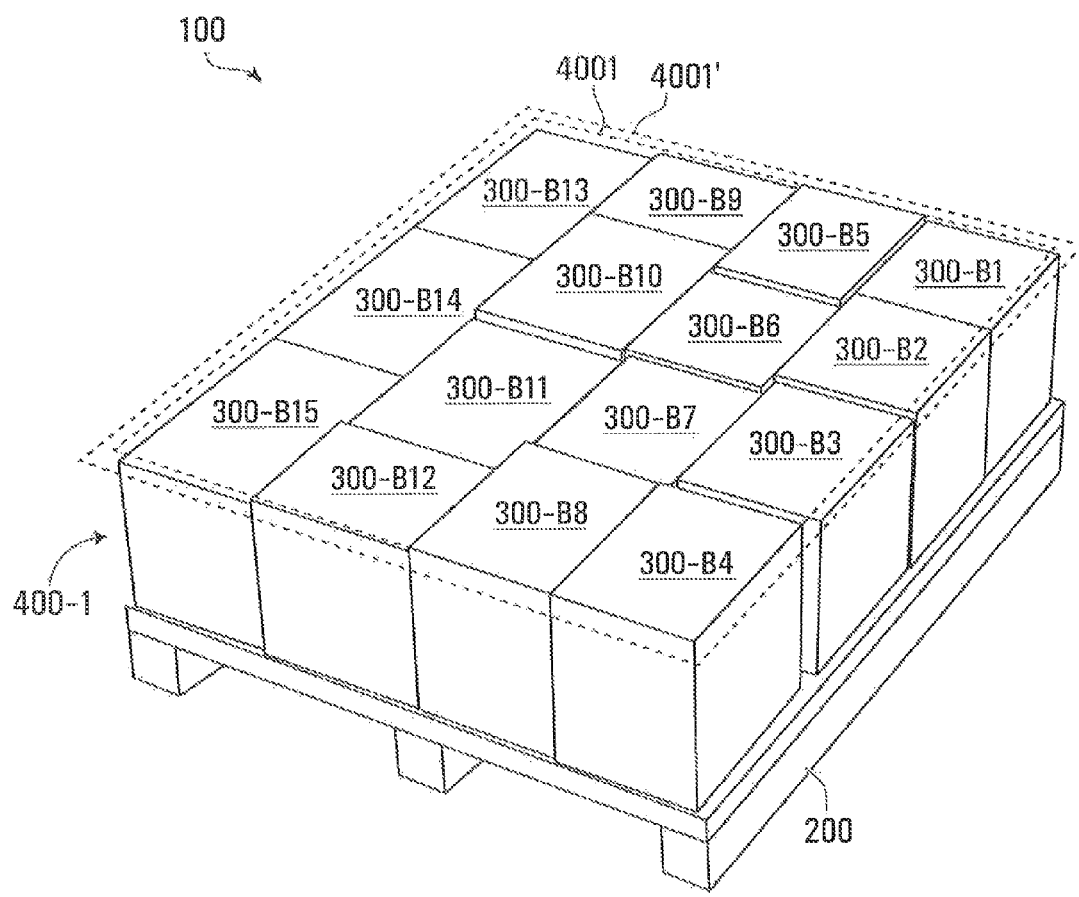
FIG. 16 is a perspective view of a finished tier built according to the layout of FIG. 14.

FIG. 16 depicts completed tier 400-1 on skid 200. Once tier 400-1 is completed, the maximum size for tier 4002 is calculated by tier parameter module 3212. The maximum size for tier 400-2 is based on the largest rectangle 4001 for which each corner lies over a container 300 in tier 400-1. In some embodiments, this rectangle may define the outer limits of tier 4002. In other embodiments, tier 400-2 may be allowed to overhang rectangle 4001 by a small predetermined amount on each side, such that the limits of tier 400-2 are defined by rectangle 4001'.

If additional containers remain to be palletized which are not yet assigned to a buffer cell 1010, palletizing control block 3204 causes conveyor 1002 to advance additional containers to re-fill the buffer cells 1010. Palletizing control block 3204 and pallet layout block 3206 then repeat the process described above until all containers have been palletized. Shipment manager 3216 then produces any necessary documentation (e.g. shipping labels).

As will be apparent to skilled persons, the devices and processes disclosed herein may be used with many different types of rectangular containers, such as boxes, cases or crates. Alternatively, the devices and processes disclosed herein could be used for palletizing any other substantially rectangular items that are suitable for stacking.

As disclosed above, tiers are built using a pallet loader. However, in other embodiments, tiers may be built using a robot with an appropriate arm and end effector. Unlike a pallet loader, a robot may be able to precisely place a container in an arbitrary position on a tier. Accordingly, a robot may be capable of building tiers precisely according to a calculated layout. Thus, for embodiments in which tiers are built using robots, it may not be necessary to simulate building. That is, block S140 of the process of FIG. 10 may be skipped.

Of course, the above described embodiments are intended to be illustrative only and in no way limiting. The described embodiments of carrying out the invention are susceptible to many modifications of form, arrangement of parts, details and order of operation. For example, software (or components thereof) described at control server 3000 may be hosted at several devices Software implemented in the modules described above could be implemented using more or fewer modules or submodules. The invention, rather, is intended to encompass all such modification within its scope, as defined by the claims.

What is claimed:

1. A method of placing generally rectangular items of varying sizes on a pallet, said method comprising:
    measuring the dimensions of a plurality of said items;
    assigning each one of said plurality of said items to one of a plurality of buffer cells; and
    forming a plurality of tiers of said items atop a base, wherein said forming comprises, for each tier:
        defining a periphery based on the dimensions of an underlying supporting surface;
        generating a plurality of candidate tier layouts, wherein each of said candidate tier layouts is represented as a two dimensional arrangement of a subset of said plurality of items that have not yet been placed on said pallet and that have been assigned to buffer cells, and each of said candidate tier layouts includes an identification of positions of all items in said candidate tier layout of said pallet, wherein said two dimensional arrangement is bounded by said periphery;

calculating a value of a tier quality metric for said candidate tier layouts, said tier quality metric representing at least one of stability, area utilization and volume utilization;

selecting one of said candidate tier layouts based on said tier quality metric;

releasing items of said subset of items in said selected one of said candidate tier layouts from their respective buffer cells;

positioning items of said subset of items in said selected one of said candidate tier layouts atop said pallet according to said selected candidate tier layout, in accordance with the identification of positions of all items in said selected candidate tier layout using a pallet loading machine; and assigning additional ones of said generally rectangular items to those buffer cells from which items of said subset of items have been released.

2. The method of claim 1, wherein said assigning each one of said plurality of said items to one of a plurality of buffer cells comprises storing each of said plurality of items in its respective buffer cell, and wherein said releasing items of said subset of items in said selected one of said candidate tier layouts from their respective buffers cells comprises removing each of said items in said subset of items from its respective buffer cell.

3. The method of claim 2, further comprising refilling empty ones of said buffer cells prior to said generating.

4. The method of claim 1, wherein said calculating said tier quality metric comprises computing at least one of: the ratio of the total surface area of said items in a candidate tier layout to the area of said periphery; the proportion of the surface area of each one of said items in a candidate tier layout that overlies at least one item in an immediately underlying tier; and the proportion of the total surface area of said items in a candidate tier layout that overlies at least one item in an immediately underlying tier.

5. The method of claim 1, wherein said positioning comprises conveying said items longitudinally, positioning said items longitudinally using an extendible stop, and positioning said items laterally by pushing said items with a transfer bar.

6. The method of claim 1, wherein said one of said candidate tier layouts selected based on said tier quality metric selected by calculating a value of said tier quality metric for each one of said candidate tier layouts and selecting the candidate tier layout having a highest value of said tier quality metric.

7. The method of claim 1, wherein each of said generally rectangular items is a rectangular container.

8. The method of claim 1, wherein said forming further comprises strapping each of said tiers to said pallet.

9. A non-transitory computer readable medium storing processor executable instructions for operating an automated palletizer system in accordance with the method of claim 1.

10. The method of claim 1, wherein each of said candidate tier layouts is generated by partitioning said periphery into a plurality of bounding rectangles, each of said bounding rectangles containing a two-dimensional pattern of a subset of said items.

11. The method of claim 10, wherein said candidate tier layouts are generated by calculating a set of possible bounding rectangles, iteratively calculating possible two-dimensional patterns of subsets of said items, each of said possible patterns contained within one of said possible bounding rectangles, and iteratively partitioning said periphery into possible layouts of said possible bounding rectangles.

12. The method of claim 11, wherein said two-dimensional patterns comprise at least one of: grid patterns and pinwheel patterns.

13. The method of claim 12, wherein said generating comprises sorting said plurality of items into groups of said items having approximately the same size, and wherein each said two-dimensional pattern comprises only items of a single group.

14. The method of claim 1, comprising calculating a value of a second tier quality metric for at least some of said candidate tier layouts.

15. The method of claim 14, wherein said one of said candidate tier layouts selected based on said tier quality metric is selected by calculating a value of said tier quality metric for each one of said candidate tier layouts, identifying a first candidate tier layout having a highest value of said tier quality metric and a second candidate tier layout having a highest value of said second tier quality metric, and selecting one of said first and second candidate tier layouts.

16. The method of claim 15, wherein said second tier quality metric is for evaluating a prospective topmost tier of said pallet and wherein, when said one of said candidate tier layouts selected based on said tier quality metric is the candidate tier layout having a highest value of said second tier quality metric, said selected tier layout is used as the topmost tier of said pallet.

17. An automated palletizer system comprising
a plurality of container buffers;
at least one sensor for measuring the dimension of containers assigned to said container buffers;
a pallet loading machine for arranging containers from a subset of said container buffers in a tier of a pallet within a defined periphery; and
a controller in communication with said at least one sensor and said pallet loading machine, said controller operable to compute a selected tier layout for use by said pallet loading machine, said controller operable to;
compute a plurality of candidate tier layouts, each of said candidate tier layouts represented as a two dimensional arrangement in said tier of said pallet formed from a subset of containers assigned to said container buffers that have not yet been placed on said pallet, including an identification of a position of all containers in said candidate tier layout;
calculate a value of a tier quality metric for each of said candidate tier layouts, said tier quality metric representing at least one of stability, area utilization and volume utilization;
select one of said candidate tier layouts as said selected tier layout based on said tier quality metric;
release containers in the subset of containers in said selected tier layout from their respective container buffers;
assign additional containers to those container buffers from which said containers in the subset of containers in said selected tier layout have been released; and
instruct said pallet loading machine to arrange said containers in the subset of containers in said selected tier layout, according to said selected tier layout.

18. The automated palletizer system of claim 17, wherein said controller is further operable to simulate operation of said pallet loading machine in computing each of said plurality of candidate tier layouts.

19. The automated palletizer system of claim 17, further comprising a turning apparatus operable to selectively re-orient containers from said container buffers prior to placement in a tier.

20. The automated palletizer system of claim 17, wherein each of said candidate tier layouts comprises a two dimensional arrangement of bounding rectangles within said periphery, each of said bounding rectangles containing a two-dimensional pattern of a subset of said containers.

21. The automated palletizer system of claim 20, wherein said controller is operable to calculate a set of possible bounding rectangles, to iteratively calculate possible two-dimensional patterns of subsets of said containers, each of said possible patterns contained within one of said possible bounding rectangles, and to iteratively compute said candidate tier layouts, each of said candidate tier layouts comprising a two-dimensional layout of a subset of said possible bounding rectangles within said periphery, each one of said subset of said possible bounding rectangles containing one of said possible two-dimensional patterns.

22. The automated palletizer system of claim 17, further comprising a conveyor for guiding containers in said container buffers to said pallet loading machine.

23. The automated palletizer system of claim 22, wherein said conveyor comprises a plurality of transverse conveyors controllable to eject an item from each of said container buffers.

24. The automated palletizer system of claim 22, wherein said conveyor further guides containers to said container buffers.

25. The automated palletizer system of claim 24, wherein said pallet loading machine comprises at least one squeezer bar for pushing containers in a row of said tier together.

26. The automated palletizer system of claim 25, wherein said pallet loading machine comprises an apron onto which said tier is formed.

27. The automated palletizer system of claim 26, wherein said apron is retractable.

28. The automated palletizer system of claim 22, wherein said controller is operable to release containers in the subset of containers in said selected tier layout in rows of said tier.

29. The automated palletizer system of claim 28, further comprising a row transfer bar to urge a row onto said tier.

* * * * *